US011135716B2

(12) United States Patent
Zarrouk

(10) Patent No.: US 11,135,716 B2
(45) Date of Patent: Oct. 5, 2021

(54) MINIMALLY ACTUATED SERIAL ROBOT

(71) Applicant: B.G. NEGEV TECHNOLOGIES AND APPLICATIONS LTD., AT BEN-GURION UNIVERSITY, Beer-Sheva (IL)

(72) Inventor: David Zarrouk, Bnei Brak (IL)

(73) Assignee: B.G. NEGEV TECHNOLOGIES & APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 276 days.

(21) Appl. No.: 16/088,095

(22) PCT Filed: Mar. 27, 2017

(86) PCT No.: PCT/IL2017/050376
§ 371 (c)(1),
(2) Date: Sep. 25, 2018

(87) PCT Pub. No.: WO2017/168413
PCT Pub. Date: Oct. 5, 2017

(65) Prior Publication Data
US 2020/0001452 A1  Jan. 2, 2020

Related U.S. Application Data

(60) Provisional application No. 62/315,027, filed on Mar. 30, 2016.

(51) Int. Cl.
*B25J 9/06* (2006.01)
*B25J 9/10* (2006.01)
(Continued)

(52) U.S. Cl.
CPC ............ *B25J 9/065* (2013.01); *B25J 9/08* (2013.01); *B25J 9/102* (2013.01); *B25J 17/00* (2013.01); *B25J 18/00* (2013.01)

(58) Field of Classification Search
CPC ....... B25J 9/065; B25J 9/08; B25J 9/06; B25J 9/102; B25J 9/1005; B25J 9/10; B25J 17/00; B25J 18/00
See application file for complete search history.

(56) References Cited

U.S. PATENT DOCUMENTS 9,796,092 B2 * 10/2017 Sato ...................... A61B 34/30
2003/0004399 A1    1/2003 Belson
(Continued)

FOREIGN PATENT DOCUMENTS

CN    105945926 A  *  9/2016  .............. B25J 9/065
CN    107756386 A  *  3/2019  .............. B25J 19/00
(Continued)

OTHER PUBLICATIONS

Machine Translation of WO-2018159400-A1, obtained Nov. 20, 2020.*
(Continued)

*Primary Examiner* — Thomas C Diaz
*Assistant Examiner* — Brian J McGovern
(74) *Attorney, Agent, or Firm* — Nixon & Vanderhye PC

(57) ABSTRACT

The present invention relates to a robot device comprising a chain comprising a plurality of fixedly connected links and a mobile actuator movable thereon configured to change a position of a link relative to a position of an adjacent link; wherein said mobile actuator comprises at least a first motor to drive it along said chain of connected links; and wherein said mobile actuator is engageable with a position-determining element in said link.

20 Claims, 21 Drawing Sheets

(51) Int. Cl.
  *B25J 17/00* (2006.01)
  *B25J 18/00* (2006.01)
  *B25J 9/08* (2006.01)

(56) References Cited

U.S. PATENT DOCUMENTS

| | | | |
|---|---|---|---|
| 2009/0222133 A1 | 9/2009 | Buckingham et al. | |
| 2013/0068061 A1* | 3/2013 | Yoon | B25J 18/025 74/490.05 |
| 2016/0311108 A1* | 10/2016 | Alambeigi | A61B 1/128 |
| 2017/0225327 A1* | 8/2017 | Yoon | B25J 9/126 |
| 2018/0207812 A1* | 7/2018 | Yoon | F16H 19/0636 |
| 2019/0168832 A1* | 6/2019 | Zarrouk | F16H 25/14 |

FOREIGN PATENT DOCUMENTS

| | | | | |
|---|---|---|---|---|
| CN | 110125922 A | * | 8/2019 | B25J 19/00 |
| WO | WO-2016158279 A1 | * | 10/2016 | B25J 17/00 |
| WO | WO-2018159400 A1 | * | 9/2018 | B25J 19/00 |

OTHER PUBLICATIONS

Machine Translation of CN-110125922-A, obtained Nov. 20, 2020.*
Machine Translation of CN-107756386-A, obtained Nov. 20, 2020.*
Machine Translation of CN-105945926-A, obtained Nov. 20, 2020.*
Machine Translation of WO-2016158279-A1, obtained Nov. 20, 2020.*
International Search Report for PCT/IL2017/050376, dated Jul. 26, 2017, 3 pages.
Written Opinion of the ISA for PCT/IL2017/050376, dated Jul. 26, 2017, 4 pages.
Chirikjian, "Theory and Applications of Hyper-Redundant Robotic Manipulators", California Institute of Technology, PhD. dissertation 1992, 180 pages.
Chirikjian et al., "An Obstacle Avoidance Algorithm for Hyper-Redundant Manipulators", IEEE, May 1990, pp. 625-631.
Chirikjian et al., "Design and experiments with a 30 DOF robot", IEEE, May 1993, pp. 113-119.
Chirikjian, "Hyper-Redundant Robot Mechanisms and Their Applications", IEEE/RSJ International Workshop on Intelligent Robots and Systems, Nov. 3-5, 1991, pp. 185-190.

* cited by examiner

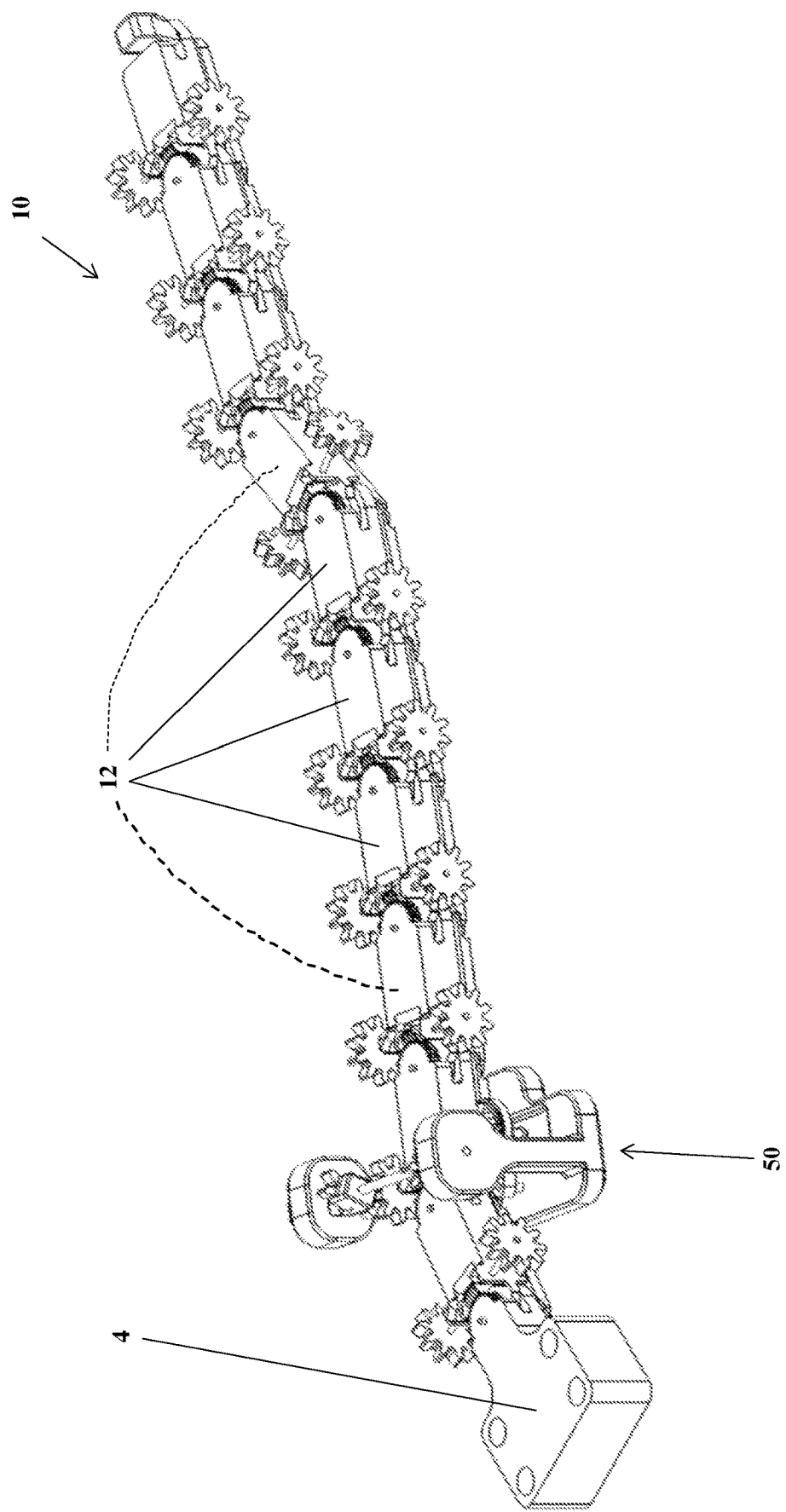

Fig 1B
Fig 1C
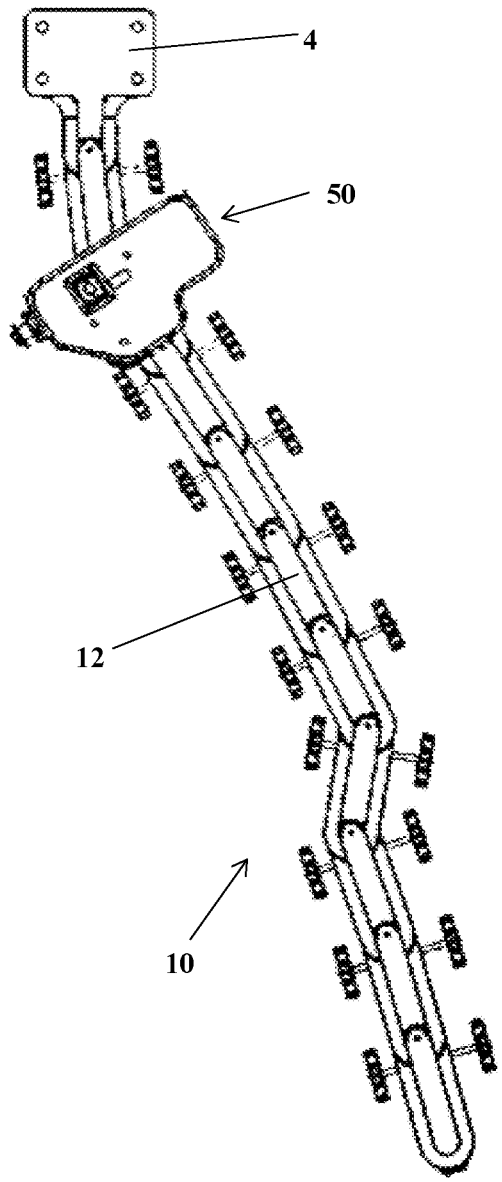
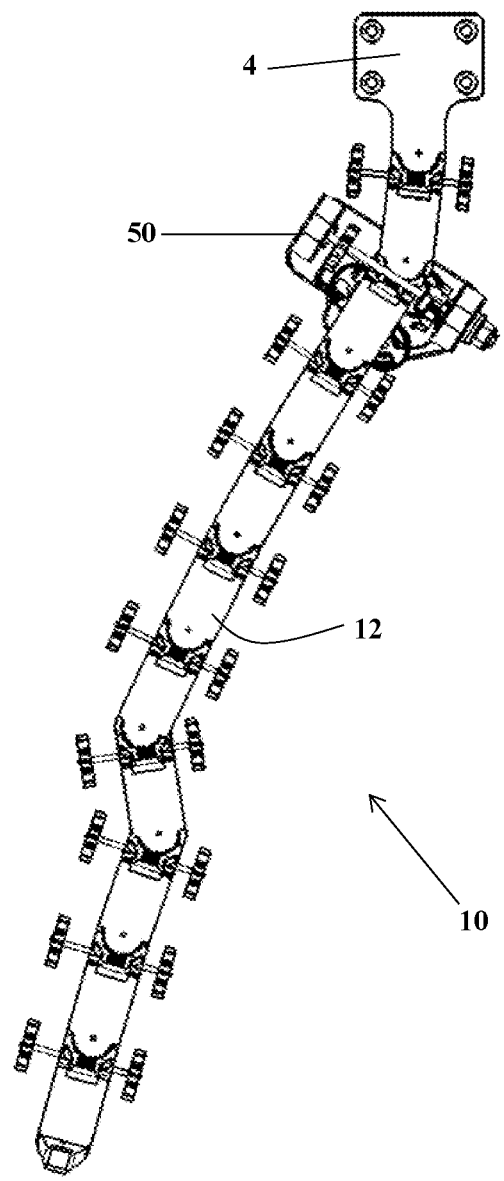

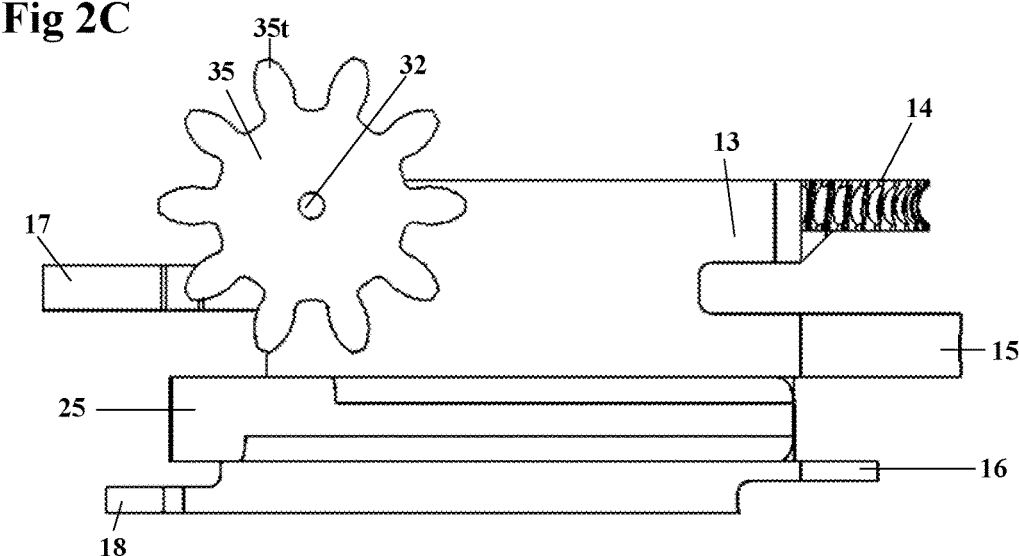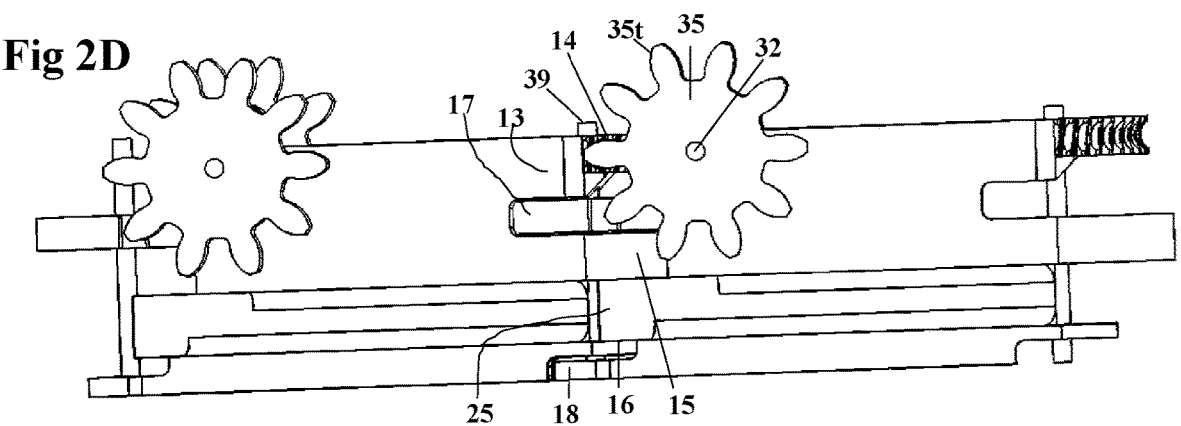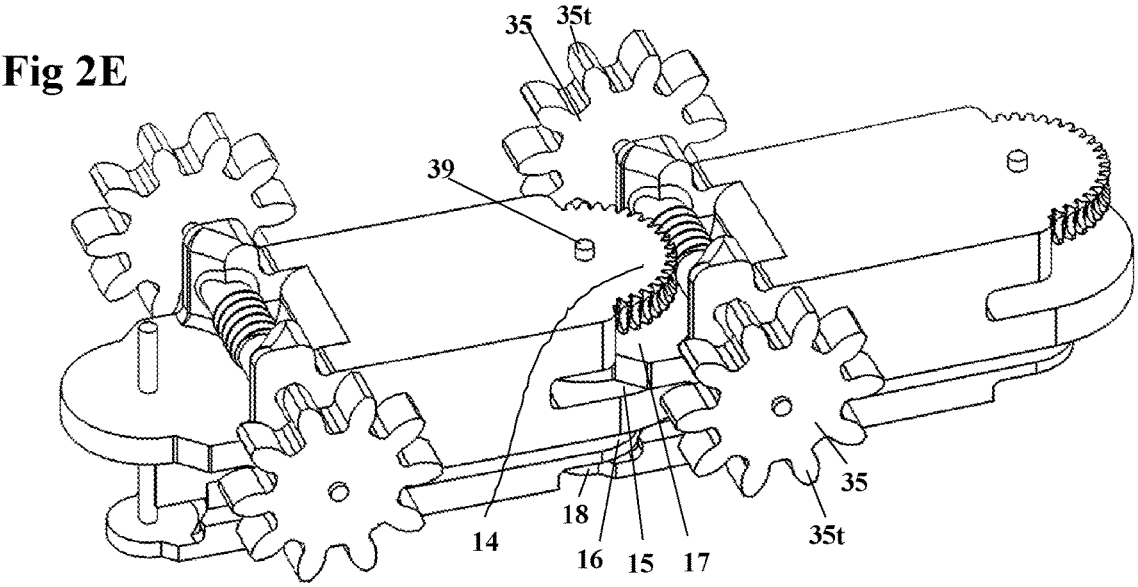

Fig 7A
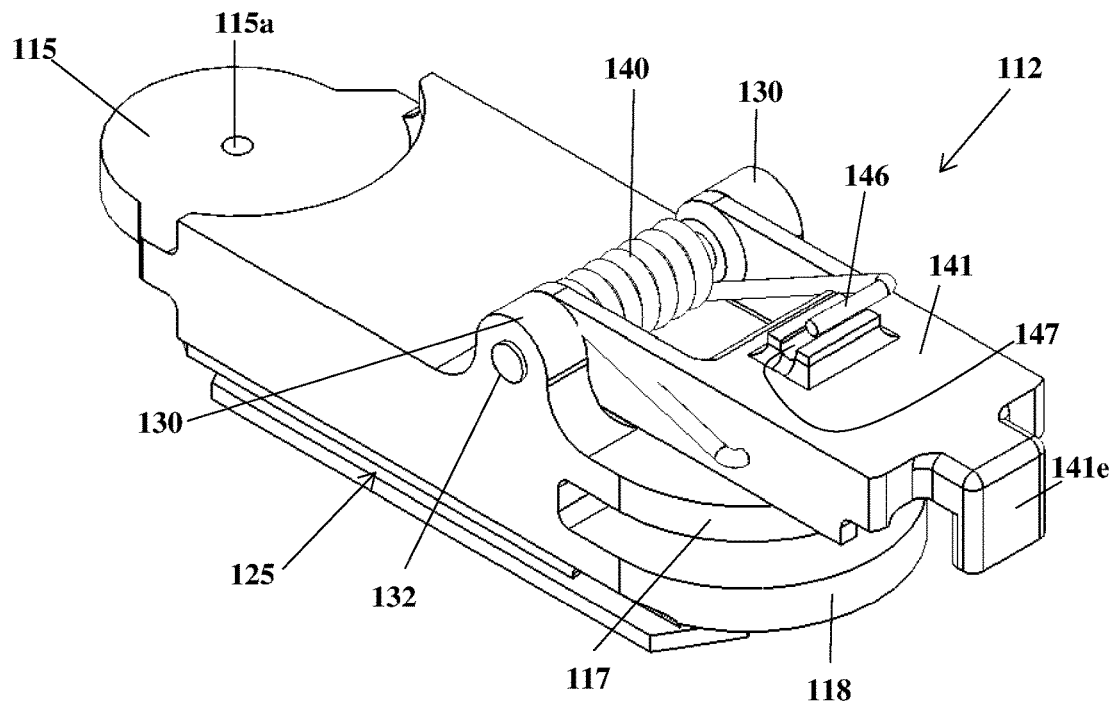
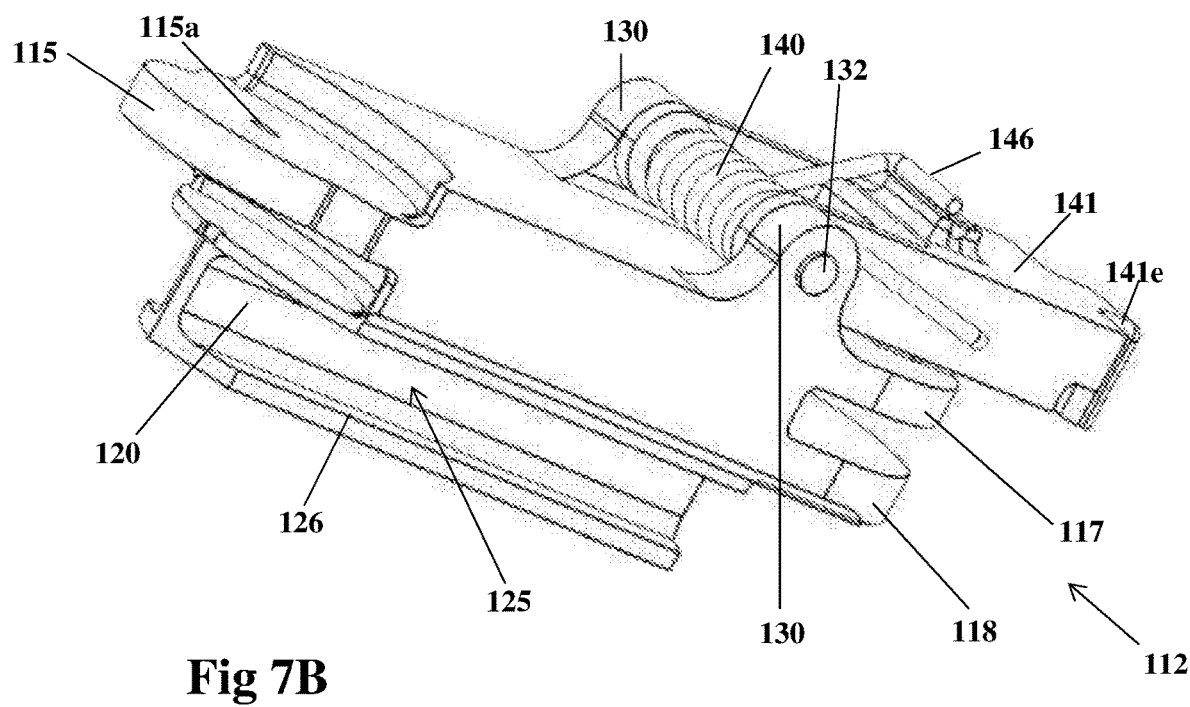
Fig 7B

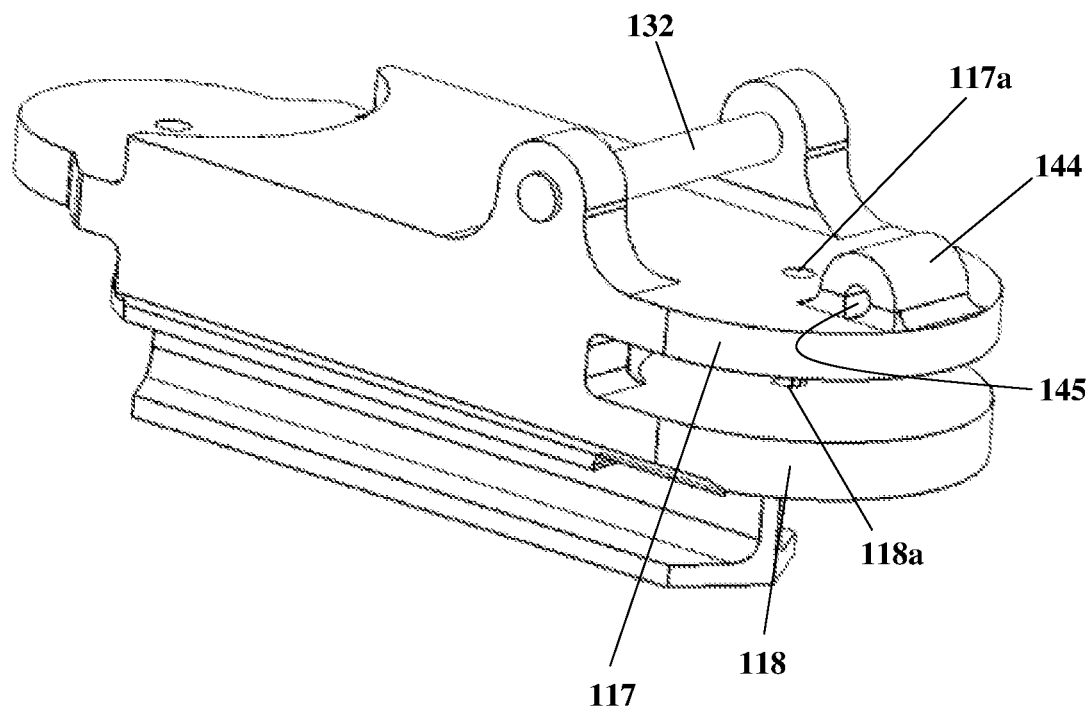

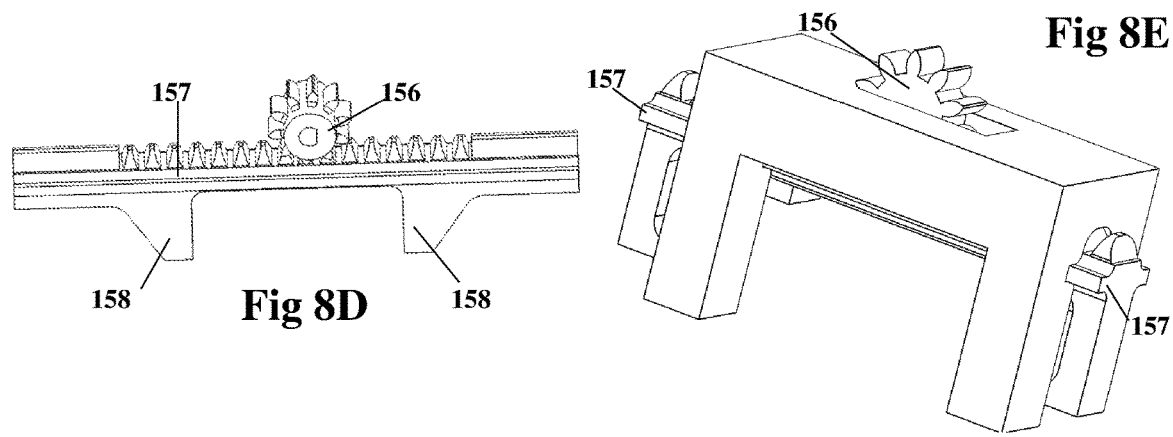
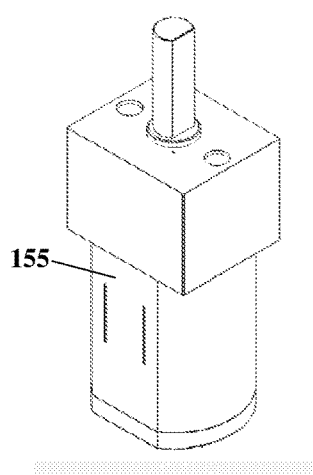
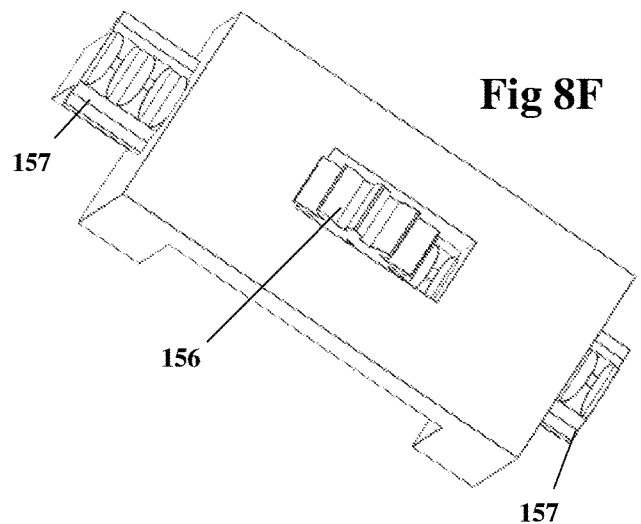
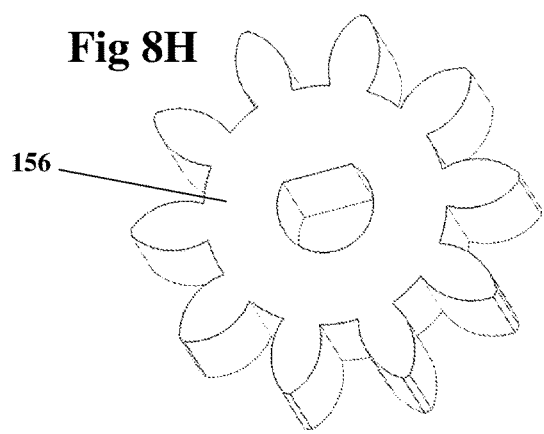
Fig 8D  Fig 8E  Fig 8G  Fig 8F  Fig 8H

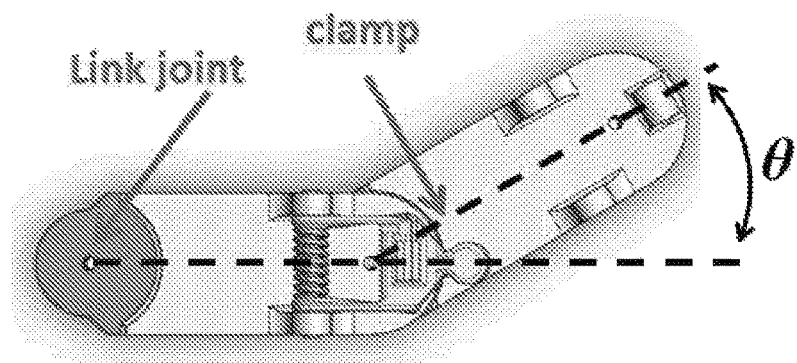
Fig. 11A
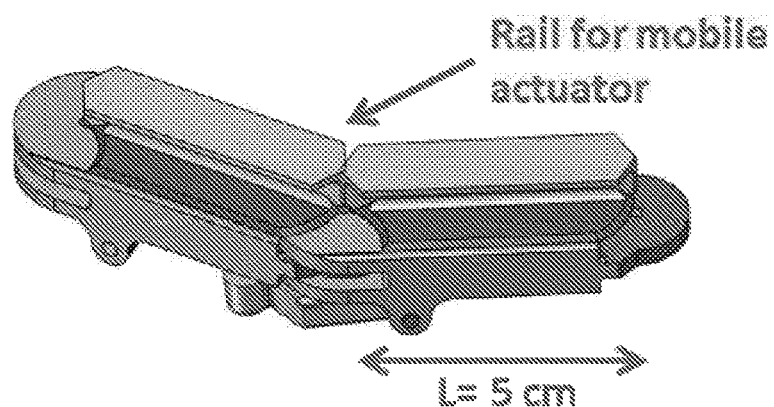
Fig. 11B
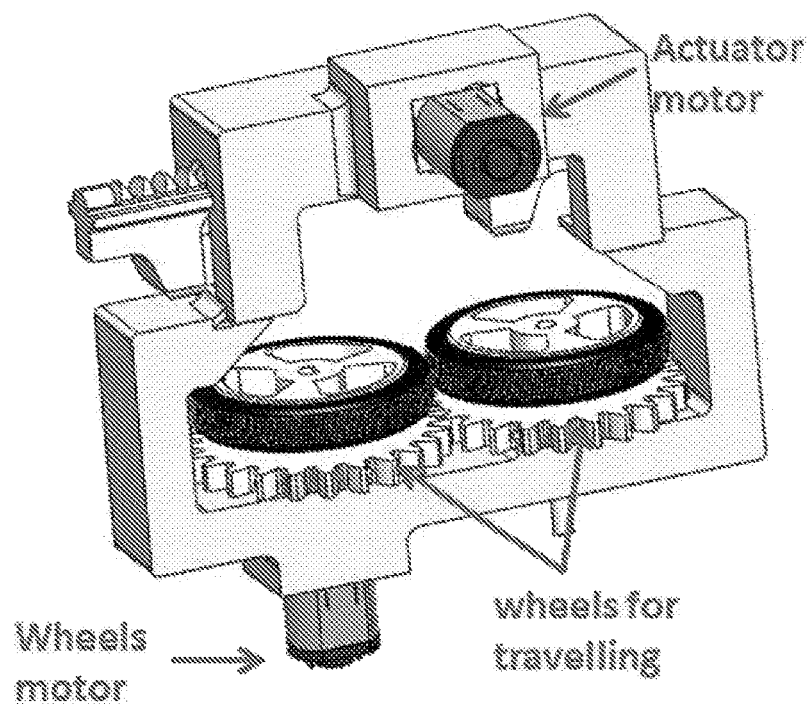

MINIMALLY ACTUATED SERIAL ROBOT

This application is the U.S. national phase of International Application No. PCT/IL2017/050376 filed 27 Mar. 2017, which designated the U.S. and claims the benefit of U.S. Provisional Patent Application No. 62/315,027 filed 30 Mar. 2016, the entire contents of each of which are hereby incorporated by reference.

FIELD OF THE INVENTION

The present invention relates to the field mechanics. More particularly, the present invention relates to a mechanical robot capable of being maneuvered by a single actuator.

BACKGROUND OF THE INVENTION

Hyper redundant robots are robots with serially connected links that possess a large kinematic redundancy.

Alternatively known as snake robots, they are the subject of extensive research over the past several decades with many different configurations, mechanisms, control strategies, and motion planning algorithms being proposed over the years. The principle motivation for developing hyper redundant robots is their ability to navigate around obstacles and in highly confined spaces.

Algorithms for planning the motion of hyper redundant robots present a formidable challenge. Early motion planners for hyper-redundant robot motion planning were developed by Gregory Chirkjian in:

G. S. Chirikjian, *"Theory and Applications of Hyper-Redundant Robotic Manipulators," California Institute Of Technology*, Ph.D. dissertation 1992.

G. S. Chirikjian and J. W. Burdick, *"An obstacle avoidance algorithm for hyper-redundant manipulators,"*, Cincinnatti, Ohio, May 1990.

G. S. Chirikjian and J. W. Burdick, *"Design and experiments with a 30 DOF robot,"*, Atlanta, Ga., May 1993.

G. S. Chirikjian, *"Hyper-Redundant Robot Mechanisms and Their Applications,"*, Osaka, Japan, November 1991.

In those works, the curvature of the robotic snake was approximated as a continuous modal function with the obstacles expressed as boundary constraints on the robot's shape. Many recent works have addressed obstacle avoidance schemes for hyper redundant robots. State-of-the-art approaches including genetic algorithms, variational methods, and probabilistic roadmaps are used to plan the motions of the robots.

Flexible robots have been developed as an alternative. Also known as soft robots or continuum robots, they consist of a flexible continuous structure that possess, at least in theory, an infinite number of degrees of freedom. The advantage of flexible robots over hyper-redundant robots is their lightweight and speed. However, they are inaccurate, difficult to control, and have low position sensing capabilities.

It is therefore an object of the present invention to provide means for an energy efficient robot to carry out various tasks.

It is a further object of the present invention to provide means for an accurate compact robot.

Other objects and advantages of the present invention will become apparent as the description proceeds.

SUMMARY OF THE INVENTION

The present invention relates to a robotic device comprised of connected links. The device can execute complex motions with a small number of actuators. The present invention comprises a mobile actuator that shifts the position of the links along the joints of the robot. This enables the shaping of the robot to any desired position by incrementally adjusting its joints. The robot is suitable for applications in a complex and confined environment with low payload and that do not require rapid deployment. The robot is also very modular, the number of links and mobile actuators can be changed easily.

The present invention mobile actuator is travelable on the connected links and is engageable with a position determining element at the joints of the links. The mobile actuator may activate a motor that powers the position shifting of one of the links in relation to its adjacent link. The links positioning one in relation to its adjacent other may be in in the same plane or in various 3D directions.

The present invention relates to a robot device comprising a chain of a plurality of fixedly connected links and a mobile actuator movable thereon configured to change a fixed orientation between two adjacent connected links of said plurality of fixedly connected links;

wherein said mobile actuator comprises a first motor to travel along the connected links, and a second motor to change the fixed orientation between two connected links.

The present invention relates to a robot device comprising a chain comprising a plurality of fixedly connected links and a mobile actuator movable thereon configured to change a position of a link relative to a position of an adjacent link;

wherein said mobile actuator comprises at least a first motor to drive it along said chain of connected links; and wherein said mobile actuator is engageable with a position-determining element in said link.

Preferably, each of said links is responsive to a rotational movement generated in said actuator by a second motor coupled to said actuator such that said rotational movement affects the position of the link in relation to its adjacent link.

Preferably, the changing of a position of a link relative to a position of an adjacent link is carried out by a worm gear mechanism.

Preferably, the connection between two adjacent links comprises a shaft inserted in an aperture on a surface extending proximally from the distal adjacent link and in an aperture on a surface extending distally from the proximal adjacent link.

Preferably, the changing of a position of a distal link of two adjacent links of the chain of links relative to a position of the proximal link of said two adjacent links is carried out by a worm gear mechanism;

wherein the proximal link of the two adjacent links comprises a worm wheel surface extending distally therefrom that engages with a worm screw attached on the proximal side of the distal link.

Preferably, the worm screw is mounted on a rotatable horizontal shaft fixed on the proximal side of the distal link.

Preferably, the robot device further comprises at least one wheel gear fixedly mounted on the shaft such that when the wheel gear rotates the shaft rotates respectively.

Preferably, the mobile actuator comprises a horizontal rotatable axle mounted thereon and at least one spinning gear element fixedly mounted on said horizontal rotatable axle such that the spinning gear element is engageable with the wheel gear.

Preferably, the robot device further comprises a second motor coupled to the mobile actuator configured to generate a rotational movement that rotates the horizontal rotatable axle.

Preferably, the links further comprise two side channels along their length wherein each side channel is substantially continuous with its corresponding side channel of its adjacent link thus forming a track; wherein the mobile actuator comprises two wheels mounted thereon configured to drive along said track (e.g. each wheel along and within one side channel).

Preferably, the links are disposed on an imaginary plane; and the change of a position of a link relative to a position of its adjacent link is such that one of said adjacent links is rotationally displaceable, with respect to an axis substantially perpendicular to said imaginary plane, in relation the other adjacent link.

Preferably, the changing of a position of a link relative to a position of an adjacent link is carried out by a rack and pinion mechanism.

Preferably, the changing of a position of a distal link of two adjacent links of the chain of links relative to a position of the proximal link of said two adjacent links is carried out by a rack and pinion mechanism;

wherein the distal link of the two adjacent links comprises a fixation element extending proximally therefrom; wherein said fixation element comprises a clamp extending downwards from said fixation element proximal end; wherein said clamp is engageable with a top portion of the distal link, pushing down on it maintaining fixation therebetween.

Preferably, the robot device further comprises a torsion spring fixed at one of its ends to a portion of the distal link and fixed at its other end on top of the fixation element such that the torsion force of the torsion spring applies a downward force causing the clamp to push down on the top portion of the distal link.

Preferably, the robot device further comprises a rotatable horizontal shaft fixed to the distal link;

wherein the torsion spring is mounted on said shaft; and wherein the fixation element comprises at least one distal arm fixedly mounted on said shaft such that said fixation element is rotationally displaceable with respect to said shaft axis.

Preferably, the mobile actuator comprises a circular pinion element and a linear rack element engageable therewith such that a rotational movement that rotates said pinion element around its central axis causes said rack element to move linearly;

said device further comprising a second motor coupled to the mobile actuator configured to generate a rotational movement that rotates said pinion element around its central axis;

wherein said linear rack element comprises two spaced apart protrusion elements extending downwards therefrom engageable with the clamp.

Preferably, the protrusion elements are configured to push the clamp sideways when engaged therewith, upon a linear movement of the rack element causing said changing of a position.

Preferably, the robot device further comprises a second motor coupled to the mobile actuator and a controller coupled to the first and second motor configured to activate them.

Preferably, the robot device further comprises an encoder; said encoder comprising a sensor attached to the mobile actuator and coupled to the controller and scales that encode location placed on or near the joints between two adjacent links.

Preferably, the robot device further comprises a rotary encoder;

said rotary encoder comprising a sensor attached to the mobile actuator and coupled to the controller, and pairs of two identifiable elements placed on or near the joints between two adjacent links;

wherein one of the identifiable elements of each pair is placed on the distal link of the adjacent links and the other identifiable elements of each pair is placed on the proximal link of the adjacent links.

BRIEF DESCRIPTION OF THE DRAWINGS

The present invention is illustrated by way of example in the accompanying drawings, in which similar references consistently indicate similar elements and in which:

FIG. 1A illustrates a worm gear embodiment of the present invention.

FIGS. 1B-1C illustrate top and bottom views respectively of the embodiment of FIG. 1A.

FIGS. 2A-2C illustrate different angles of the link of the worm gear embodiment of the present invention.

FIGS. 2D-2E illustrate different angles of two adjacent links of the worm gear embodiment of the present invention.

FIGS. 7A-7B illustrate different angles of the link with the torsion spring embodiment of the present invention.

FIG. 7C illustrates a protruding section of a link according to an embodiment of the present invention.

FIGS. 8D-8H illustrate elements relating to the rack and pinion embodiment of the present invention.

FIG. 11a illustrates two views of two adjacent links according to an embodiment of the present invention.

FIG. 11b illustrates an actuator according to an embodiment of the present invention.

DETAILED DESCRIPTION OF THE INVENTION

Figure 2A:
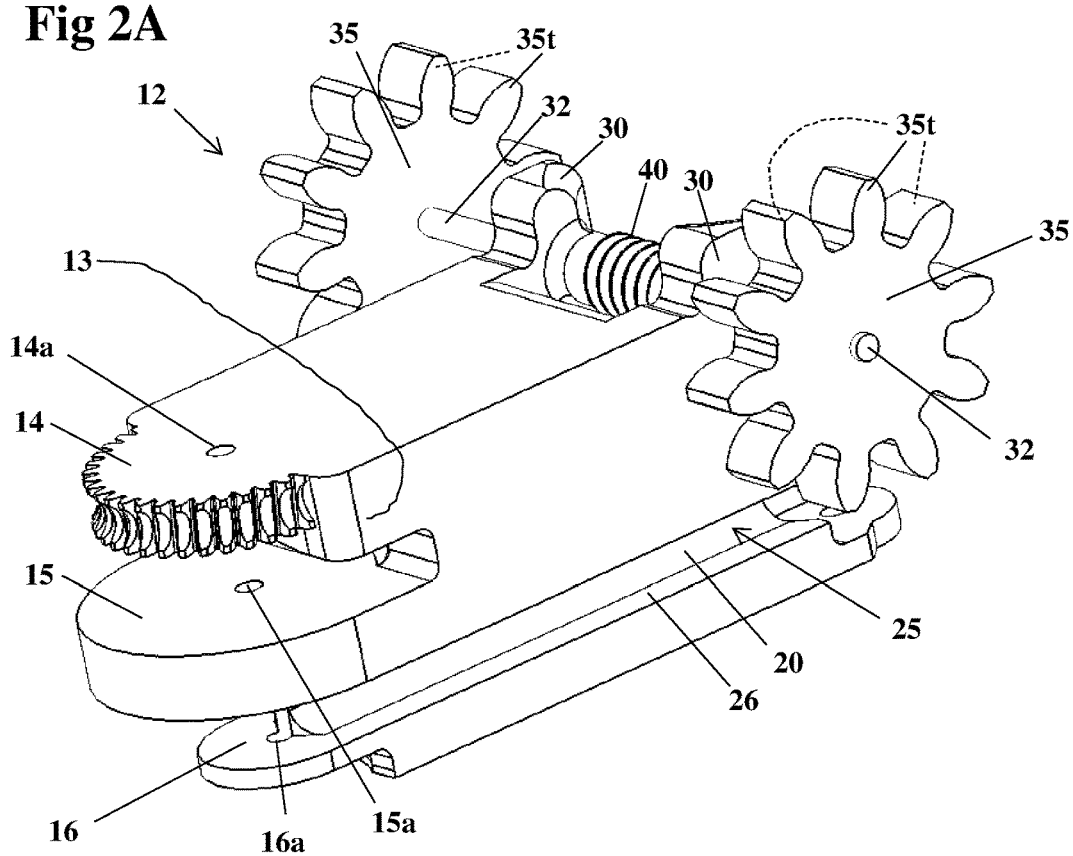

The present invention relates to a serial robot with minimal actuation. The robot is a serial (preferably rigid) structure comprising a plurality of links connected by passive joints and one or more mobile actuators movable thereon. The mobile actuators travel over the links to a given joint and adjust the relative angle between two adjacent links. The joints passively preserve their angles until the actuator adjusts them again. This actuation can be applied on a robot with two or more links. As the prior art hyper-redundant robots typically comprise actuators/motors at the joints between each pair of two adjacent links in order to change the angle, the present invention configuration enables the robot to undergo the same wide range of motions typically associated with prior art hyper-redundant robots, but with much fewer actuators. This contributes to the power efficiency of the robot.

The present invention robot is advantageous as it does not need to have any motors or encoders that are fixed on the joints of the links which will substantially lower the weight of moment of inertia of the robot. The present invention does not have a large number of fixed actuators at each joint which can cause slow-acting, consume power even when static and being energy inefficient. Furthermore, the present invention does not have a large number of fixed actuators at each joint that produces a bulky design which can result in a low operating payload and large deflections. The present invention robot that obviates these elements also obviates the need to have wirings along the links. As a result the present invention robot has a lightweight and is cheap to manufacture. Another advantage is that in many cases, the robot will be more efficient energy wise because of its lower weight.

The passivity of the joints is defined by there being no motors in between them, while the angle between adjacent links is preserved. The position of a link is fixed in relation to its adjacent link. The number of links and mobile actuators can be easily varied depending on the proposed task. When a mobile actuator travels over the links, it can rotate the desired joint thereby changing the relative angle between the links by a desired angle. The base is where the robot is connected to a constant support or a mobile platform.

The present invention robot may be modular and its size and geometry can be adapted for various applications. The present invention has various maneuvering capabilities including obstacle avoidance and maneuvering through a confined space to reach its target.

The present invention robot (herein referred to as MASR—Minimally Actuated Serial Robot—interchangeably) combines some characteristics and advantages from both hyper redundant robots and compliant robots. The actuators translate over the links to any given joint and adjust it to the desired angular displacement. The joint passively preserves its angle until it is actuated again. The number of degrees of reconfigurability (DOR) is equal to the number of joints. This enables the MASR to achieve similar mobility to regular hyper redundant robots. The advantages of MASR are its simplicity, smaller weight, higher energy density (power/mass), low cost and modularity, as the number of links and actuators can be easily and quickly changed.

The minimal actuation is in that the entire mobility of the robot may be maneuvered by just one mobile actuator that may comprise just two motors. One of the two motors is for the mobility of the mobile actuator itself traveling on the links (to drive the mobile actuator along the chain of links) and the other motor is for changing the angle of the joints. This advantage contributes to an energy efficient consumption of power in relation to prior art robots comprising actuators at each joint. Other embodiments may include the length distancing between two adjacent links by the mobile actuator. The angle changing may be in the 3D dimension.

The present invention may have various uses such as in machinery, piping applications, manufacturing applications, medical applications, agricultural applications, rescue appliances, space applications etc.

FIGS. 1A-1C show a preferred embodiment of the present invention. FIG. 1A shows a serial robot 10 comprising a chain comprising a plurality of links 12 and a mobile actuator 50 movable thereon. Each pair of adjacent links form a passive joint therebetween. The mobile actuator 50 is configured to travel over the links to a given joint and adjust the position of a link relative to a position of an adjacent link, e.g. adjust the relative angle between two adjacent links. The joints passively preserve their angles until the actuators adjusts them again. This embodiment is explained in relation to the links and adjusted angles being on a common plane, however, the present invention also relates to angle adjusting between links in the three dimensions in space.

The robot 10 comprises a base 4 at its proximal end configured to be fixed to a surface or platform. According to one embodiment the base is at a location high enough such that all the links will be horizontally in the air such that the mobile actuator can fully travel while being around the links. Other embodiments may comprise the links resting on a surface and the mobile actuator engaging the links from above and on the side (without portions driving under).

Optionally the present invention robot may comprise an end effector (not shown) at its distal end connected to the most distal link. Within this disclosure the terms "distal direction" as used in connection with the robot is the direction towards the front of the robot away from the base and the "proximal direction" is opposite to the distal (e.g. the direction towards the base 4).

In general the term horizontal herein refers to the direction parallel to an imaginary plane whereon the links are initially disposed on. In general the term vertical herein relates to the direction perpendicular to the imaginary plane whereon the links are initially disposed on.

The end effector may comprise one or more of the following: a gripper, a magnet, a welding power supply (welding unit), a scissors, an illumination unit, etc. The present invention robot may use the end effector for carrying out various tasks.

According to this preferred embodiment, the angle adjusting between the links at the joints is according to a worm drive (worm gear) mechanism. The distal portion of link 12 comprises a round portion being the worm wheel that meshes with a worm screw located at the proximal portion of the link's adjacent distal link. FIGS. 1B-1C show a top view and a bottom view of robot 10 respectively. FIGS. 2A-2D show an embodiment of the worm drive links.

FIG. 2A shows an embodiment of a single link 12 of the robot 10. Link 12 comprises a rectangular cuboid body comprising distal and proximal surfaces extending therefrom that assist in connecting with adjacent links in a supportive and stable manner. The top portion of the link 12 comprises a flat distal surface 13 having a thickness, extending distally therefrom. The top portion distal surface 13 comprises a distal round surface extending distally therefrom being the worm wheel 14. The worm wheel 14 preferably comprises a round half circular shape having peripheral teeth at its half circular edge and having a thickness configured to mesh with the worm screw of its adjacent distal link. The teeth are curved inwards such that they adequately mesh with the worm screw of the adjacent distal link. The link 12 comprises a flat surface having a thickness, parallel to worm wheel 14 and extends distally from the body of the link 12. Flat surface 15 is lower than worm wheel 14. The link 12 comprises a flat surface 16 having a thickness, and is parallel to worm wheel 14 and to flat surface 15. Flat surface 16 extends distally from a low portion of link 12 and is lower than flat surface 15. The flat surfaces 15 and 16 preferably comprise a round half circular shape. According to a specific embodiment, the radius of the round half circular shape of worm wheel 14 is larger than that of flat surface 16 and smaller than that of flat surface 15. Worm wheel 14 and flat surfaces 15 and 16 each comprise an aperture 14a, 15a and 16a respectively (having the same diameter length), all being aligned with each other such that a shaft can be inserted therethrough.

Figure 2B:
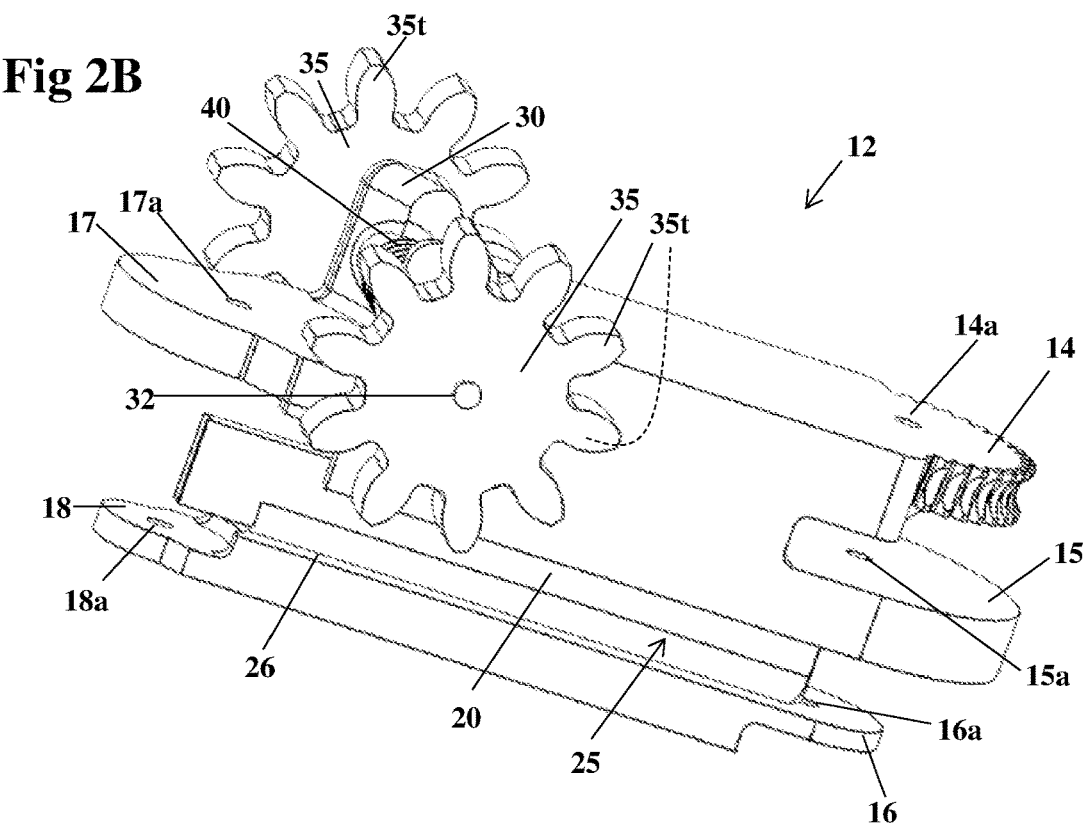

FIG. 2B shows another angle of the embodiment of FIG. 2A. The link 12 comprises a flat surface 17 having a thickness, extending proximally from the body of the link 12. Flat surface 17 is on a plane that is parallel to the planes that surfaces 15, 16 and worm wheel 14 are on. Flat surface 17 is paced beneath the plane worm wheel 14 is on and above the plane surface 15 is on. The link 12 comprises a flat surface 18 having a thickness, extending proximally from a low portion of link 12. Flat surface 18 is on a plane that is parallel to the planes that surfaces 17, 15, 16 and worm wheel 14 are on, and is placed beneath the plane surface 16 is on. Flat surfaces 17 and 18 (which are parallel) each comprise an aperture 17a and 18a respectively, being aligned with each other such that a shaft can be inserted there through.

The link 12 comprises two side channels 25 along the link bottom portion sides, thus forming a track/rail to enable the traveling of the wheels of the mobile actuator thereon. Link 12 is preferably symmetric and one channel will be explained here and it is correct for the other channel. The bottom of channel 25 is a surface 26 aligned and in continuation with the top of surface 16. The top of channel 25 is a surface (not shown) aligned and in continuation with the bottom of surface 15 (wherein the connection between the links form a small gap between adjacent (distal-proximal) channels (one side channel adjacent to its corresponding side channel in the adjacent link) that do not affect the wheels traveling therein even in cases with a large angle between the links, thus substantial continuous channels are formed being a track/rail where the wheels travel along). Channels 25 further comprise an inward side wall surface 20 having a thickness, common to both side channels (and separates them from one another) extending along the length of link 12. The height of side wall 20 is the height between the top of surface 16 and the bottom of surface 15. Side wall 20 distal end is placed between the line connecting the most proximal edge portions of apertures 15a and 16a. Side wall proximal end is placed between the imaginary line connecting the most distal edge portions of apertures 17a and 18a. The distal end of side wall 20 is round and curved inward (proximally) such as to be configured to mesh with a shaft inserted through apertures 15a and 16a. The proximal end of side wall 20 is round and curved inward (distally) such as to be configured to mesh with a shaft inserted through apertures 17a and 18a. Optionally, the channels 25 comprise two curved surfaces, one at the attachment line between side wall 20 and surface 26 and one between the attachment line between top surface of channel 25 and side wall 20.

The link 12 further comprises two proximal side ears 30 that extend proximally from an upper portion of link 12 and elevate from the sides of surface 17. Each side ear 30 comprises an aperture (not shown). The apertures are aligned with one another. A shaft 32 is inserted within both apertures such that it extends outwards beyond both apertures (wherein the shaft 32 is placed horizontally, i.e. parallel to an imaginary plane whereon the links are disposed thereon). The mobile actuator is engageable with position-determining elements—two wheel gears 35, that when rotated change the position of the link in relation to its proximal adjacent link. The two wheel gears 35 comprise apertures at their centers and peripheral teeth 35t extending outwards and are mounted (by their center apertures) and fixed to the edges of shaft 32 such that when the wheel gears 35 rotate the shaft 32 spins/rotates respectively. A worm screw 40 is mounted on the shaft 32 at the portions between side ears 30. The height of the worm screw 40 is such that when link 12 is aligned and connected to an adjacent proximal link the worm screw 40 meshes with the worm wheel 14 of the proximal adjacent link.

FIG. 2C shows a side view of link 12. FIGS. 2D and 2E show a side view and a diagonal view of two adjacent links 12 respectively where the respective heights of the parallel surfaces can be seen. For simplicity, only the connection portion including the distal portions of the proximal link and the proximal portions of the distal link are numbered. The adjacent links are connected such that the following apertures are aligned from top to bottom—14a (of proximal link), 17a (of distal link), 15a (of proximal link), 16a (of proximal link) and 18a (of distal link). A connecting shaft 39 is inserted through all five apertures connecting the links together allowing the joint angle between the links to vary, thus being a rotational joint wherein the distal link is rotationally displaceable (with respect to the axis being the shaft) in relation the proximal link.

With respect to two connected adjacent links, preferably, the thickness of surface 17 (of the distal link) is such that it is tightly fitted between surface 13 (of proximal link) and surface 15 (of proximal link). Preferably the thickness of surface 15 (of proximal link) is tightly fitted within the space between surface 17 (of the distal link) and the top of wall 20 (of the distal link). Preferably, the height of wall 20 (of the distal link) is such that the proximal end of the wall 20 (of the distal link) is tightly fitted within the space between surface 15 (of the proximal link) and surface 16 (of the proximal link). Optionally, the thickness of surface 16 (of proximal link) is tightly fitted within the space between surface 18 (of the distal link) and bottom of wall 20 (of the distal link). These tight fittings contribute to the stability of the connection of the links and to the joint angle change while maintaining a position on the same aligned plane.

Preferably, at the connection area between two adjacent links, the space between surfaces 13 and 15 is curved and complementary to surface 17. Preferably, the space between surface 17 and top of wall 20 is curved and complementary to surface 15. Preferably, the space between surface 18 and bottom of wall 20 is curved and complementary to surface 16.

Worm screw 40 of a distal link meshes with the worm wheel 14 of a proximal link. When the wheel gears 35 are rotated the worm drive mechanism changes the angle between the links (typically changing the distal link position due to the fixation of base 4) around the axis of shaft 39. The worm screw 40 contacts a peripheral portion of the half circular surface 14. The spinning of the worm screw 40 causes a shifting of the angle of the link (comprising the worm screw) caused by the change in the contact location of worm screw 40 on the peripheral portion of circular surface 14. When the wheel gears 35 are not rotated the drive mechanism firmly maintains the links position and angle therebetween (e.g. the worm gear comprises a self-locking mechanism). The rotation of wheel gears 35 in one direction causes a change in the angle in a corresponding direction, wherein the rotation of wheel gears 35 in the opposite direction causes a change in the angle in the opposite direction.

In other embodiments, the distal/proximal portions of adjacent links may be constructed in a reversed manner, e.g. the worm wheel (and other distal extending surfaces) may extend proximally from the distal link, and the worm screw, shaft, wheel gears and proximal extending surfaces may be located at the distal portion of the link (with the respective surfaces extending distally from the proximal link), mutatis mutandis.

Figure 3A:
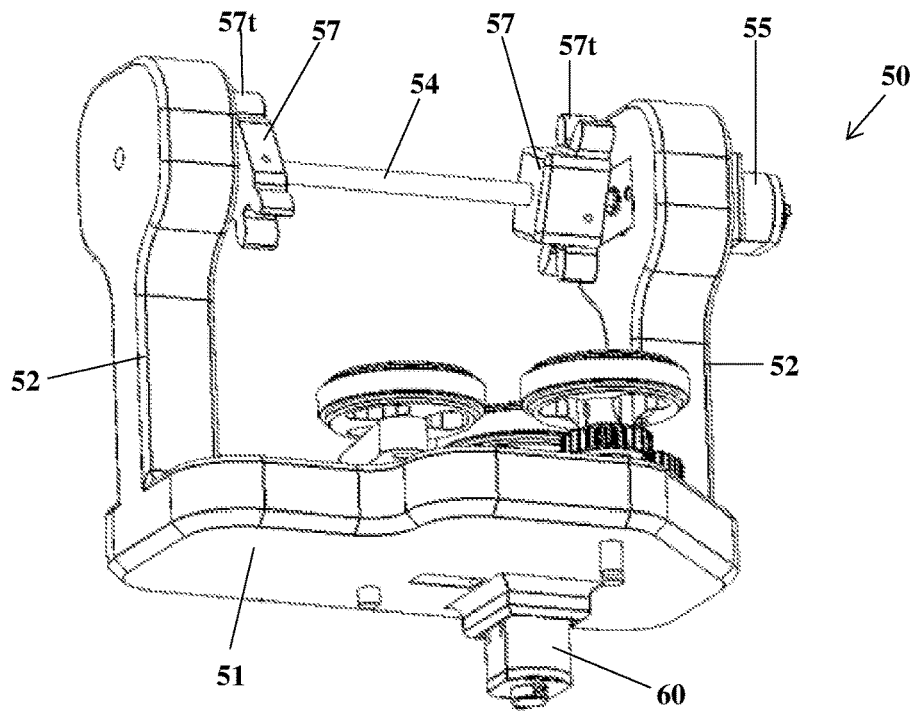
FIGS. 3A-3B illustrate different angles of an embodiment of the mobile actuator of the present invention.
Figure 3B:
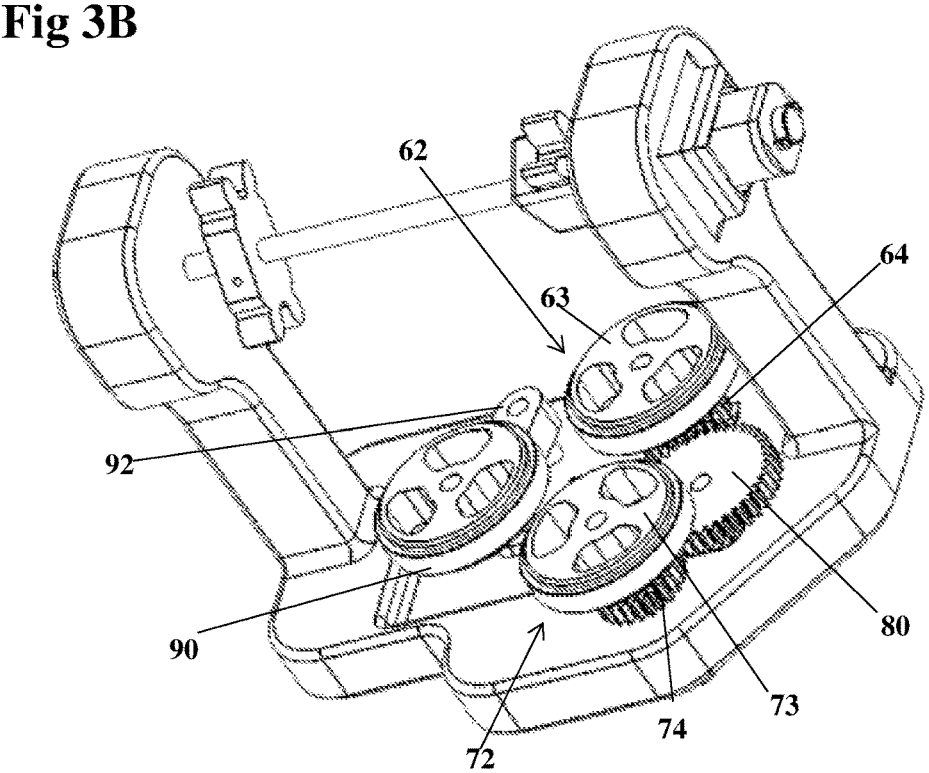

FIGS. 3A-3B show an embodiment of the mobile actuator 50 movable on the connected links. The mobile actuator 50 is hollow and when in motion the connected links pass through the hollow portion. The connected links are surrounded by the mobile actuator 50 elements. Mobile actuator 50 comprises a bottom surface 51 having a thickness and two side arm surfaces 52 having a thickness, extending upwards from the sides of surface 51. A rotatable axle 54 is connected between the inner sides of upper portions of both arms 52 (typically horizontally). One of the side arms 52 comprises a first motor 55 configured to generating rotational movement. The motor 55 is connected to the upper portion of the side arm 52 and is fixed thereto (typically passing through the arm and protruding outwards). The motor 55 is configured to rotate the rotatable axle 54 in both directions. Two spinning gear elements 57 are mounted and fixed on axle 54. Each spinning gear element 57 comprises teeth 57*t* extending outwards therefrom. The two spinning gear elements 57 are spaced apart from each other at a distance corresponding to the distance between wheel gears 35 such that when mobile actuator 50 is placed at a joint between two adjacent links, each of them meshes with a corresponding wheel gear 35. When the motor 55 spins the axle 54 the spinning gear elements 57 rotate, and rotate the corresponding wheel gear 35. The motor 55 can cause rotation in both directions thus configured to cause the wheel gears 35 to rotate in both directions, thus configured to change the angle between two adjacent links at the joint in both directions.

Figure 4A:
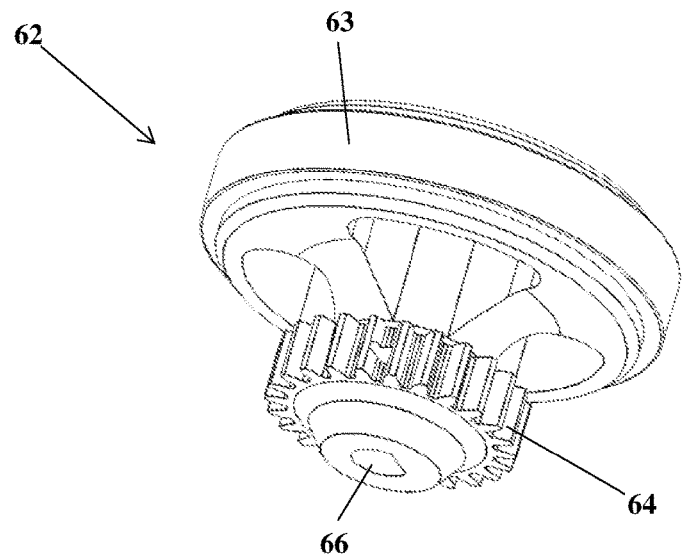
FIGS. 4A-4B illustrate different angles of a wheel assembly according to an embodiment of the present invention.
Figure 4B:
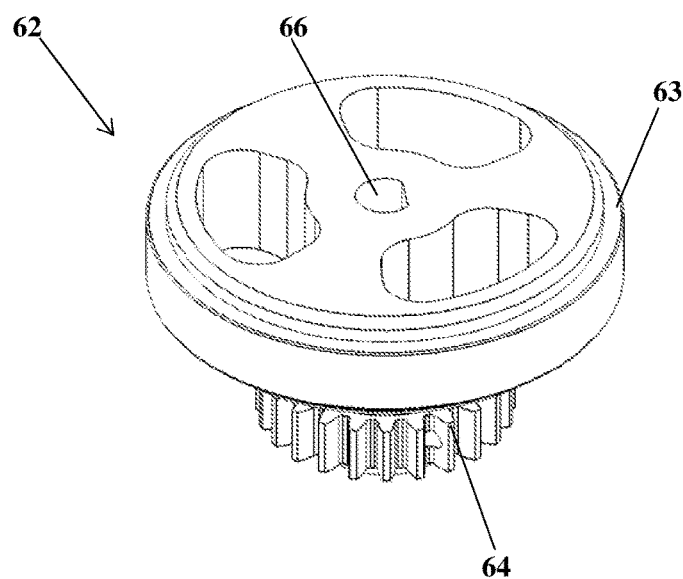
Figure 4C:
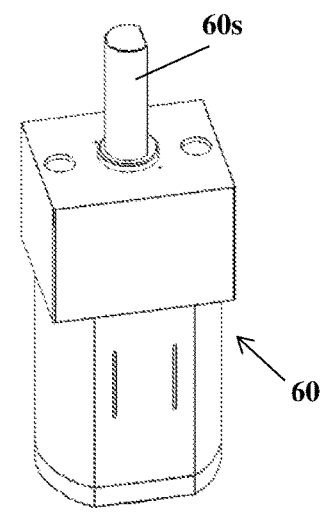
FIG. 4C illustrates an embodiment of a motor according to an embodiment of the present invention.

The mobile actuator 50 further comprises a second motor 60 configured to generate rotational movement for causing spinning motion of wheels that cause the traveling of the mobile actuator 50 distally and proximally along the connected plurality of links 12. The motor 60 is connected to the bottom surface 51 and is fixed thereto (typically passing through the surface 51 and protruding downwards). The motor 60 is configured to rotate a rotatable shaft 60*s* extending upwards therefrom (shown in FIG. 4C). The motor can cause rotation of shaft 60*s* in both directions thus configured to cause the wheels to move the mobile actuator distally or proximally.

The mobile actuator 50 comprises a wheel assembly 62 (FIGS. 4A-4B) comprising an upper wheel 63 attached to (and parallel to) a lower wheel gear 64 (wherein their circle centers are aligned). The upper wheel 63 has a circular shape and is configured to enter channel 25 of the links 12 and travel along it within it (when spinning). Lower wheel gear 64 has a circular shape and comprises peripheral teeth 64*t* at its edge. A hollow bore 66 passes from top to bottom of wheel assembly 62 along the aligned centers of upper wheel 63 and lower wheel gear 64.

The wheel assembly 62 is placed above motor 60 and mounted on shaft 60*s*. The hollow bore 66 comprises a cross sectional shape complementary to the shape of shaft 60*s* such that hollow bore 66 is tightly fitted thereon. The rotation of shaft 60*s* causes a corresponding rotation of wheel assembly 62.

The mobile actuator 50 comprises a second wheel assembly 72 comprising an upper wheel 73 attached to (and parallel to) a lower wheel gear 74 (wherein their circle centers are aligned). The upper wheel 73 has a circular shape and is configured to enter channel 25 (the same channel holding upper wheel 63) of the links 12 and travel along it within it (when spinning). The second wheel assembly 72 is placed distally to wheel assembly 62 and aligned with it in the distal-proximal axis. The lower wheel gear 74 has a circular shape and comprises peripheral teeth at its edge. Wheel assembly 72 is mounted at its center on an axle pin (not shown) fixed to the surface 51 (said axle pin extending upwards) and configured to spin around the axis of the axle pin. Both upper wheels 63 and 73 are positioned horizontally.

A wheel gear 80 is mounted at its center on an axle pin (not shown) fixed to the surface 51 (said axle pin extending upwards) and configured to spin around the axis of the axle pin. The wheel gear 80 has a circular shape and comprises peripheral teeth at its edge. The wheel gear 80 meshes with lower wheel gear 64 and lower wheel gear 74 such that when lower wheel gear 64 is rotated it rotates wheel gear 80 which rotates lower wheel gear 74.

The mobile actuator 50 comprises a wheel 90 having a circular shape and is placed and configured to enter channel 25 of the links 12 (at the side channel 25 opposite to the side channel holding upper wheels 63 and 73) and travel along it within it (when spinning). Wheel 90 is mounted at its center on an axle pin (not shown) fixed to an elevated surface 92 which is fixed on surface 51. The axle pin extends upwards and wheel 90 is configured to spin around the axis of the axle pin. The elevated surface 92 is such that that the wheel 90 is at the same height as upper wheels 63 and 73. Thus when motor 60 spins shaft 60*s* in one direction the mobile actuator 50 travels distally, and when motor 60 spins shaft 60*s* in the other direction the mobile actuator 50 travels proximally.

Figure 5A:
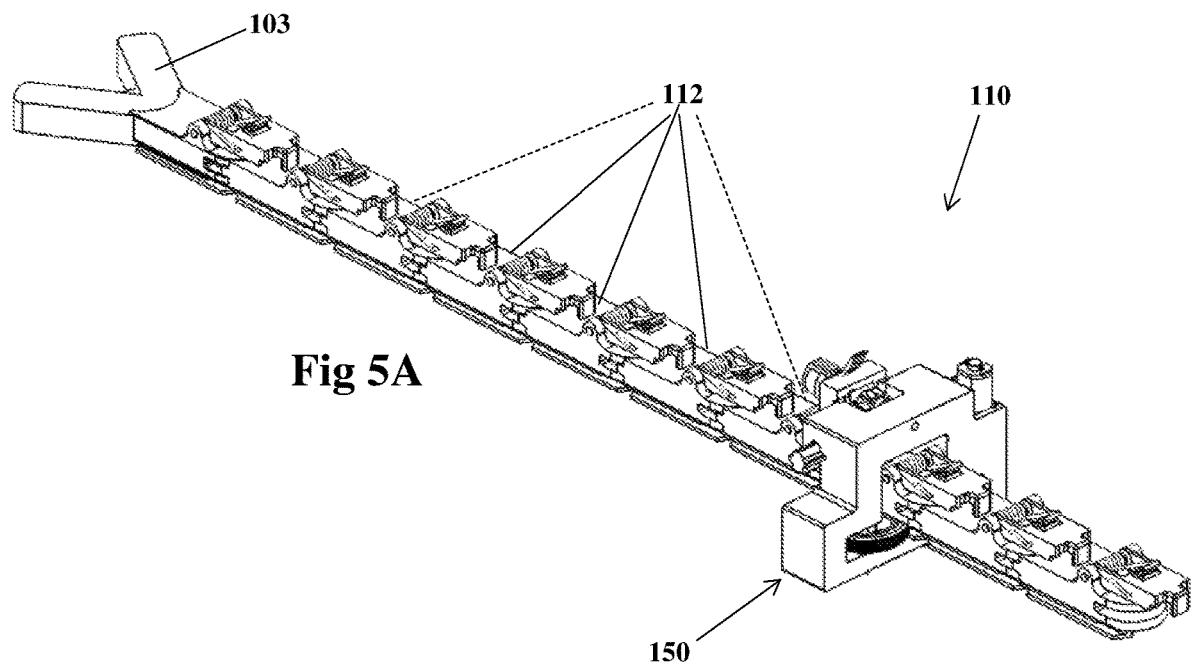
FIG. 5A illustrates a rack and pinion embodiment of the present invention.
Figure 5B:
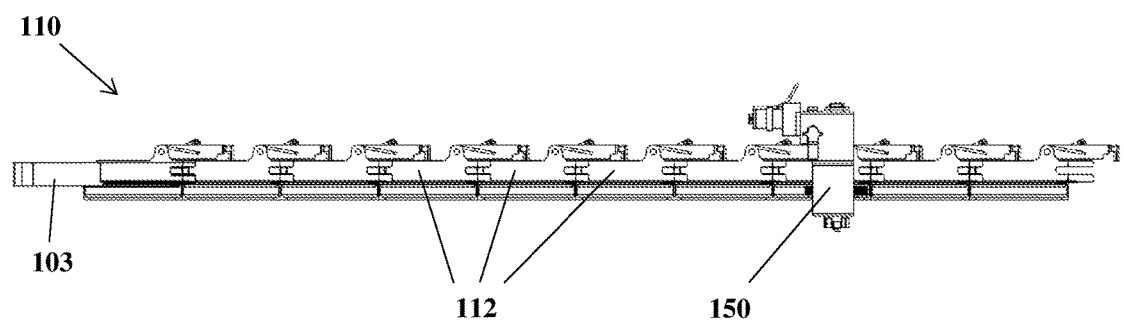
FIG. 5B illustrates a side view of FIG. 5A.

According to another embodiment of the present invention, the angle adjusting between the links at the joints is according to a rack and pinion mechanism. FIG. 5A shows a robot 110 with this adjusting mechanism comprising connected links 112, mobile actuator 150 and end effector 103 connected to the most distal link (wherein the proximal base is not shown here). FIG. 5B shows a side view of robot 110.

Figure 6A:
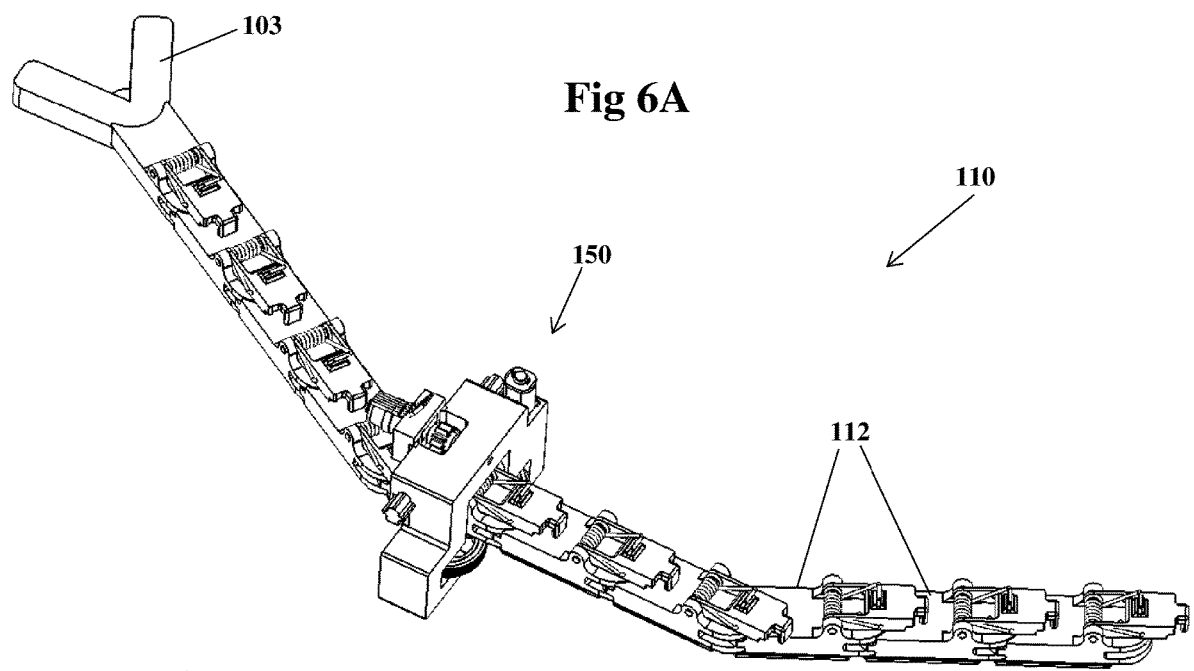
FIGS. 6A-6C illustrate a diagonal, top and bottom view (respectively) of a rack and pinion embodiment of the present invention.
Figure 6B:
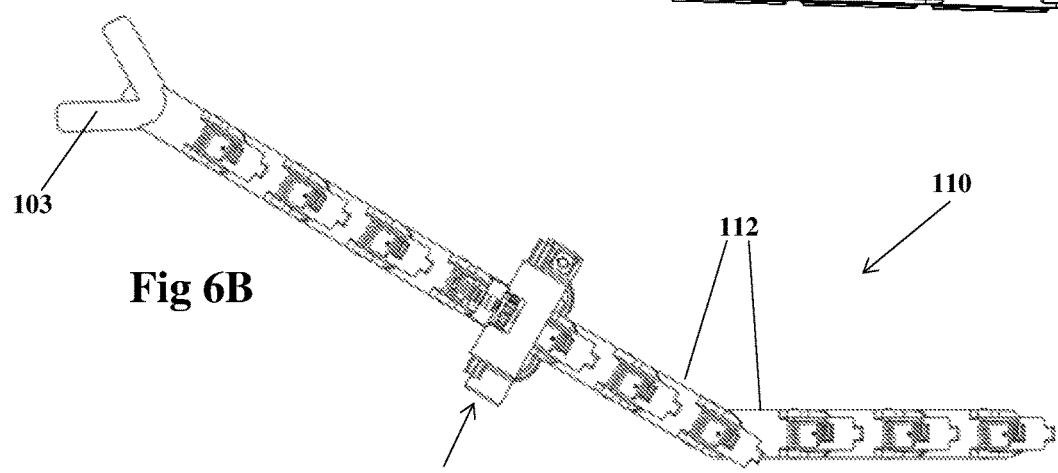
Figure 6C:
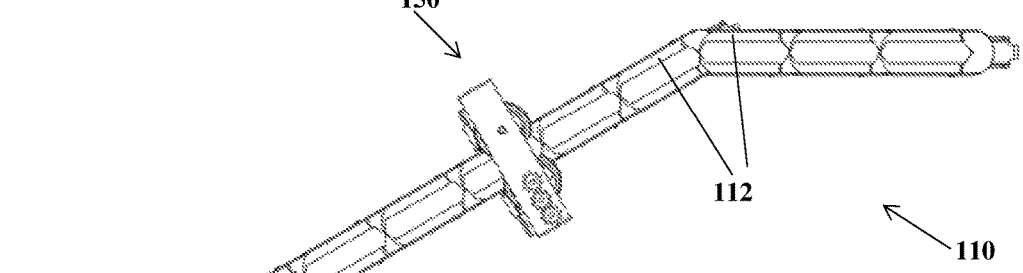

FIG. 6A shows the robot 110 with some adjusted angles. FIGS. 6B and 6C show a top and bottom view of robot 110 respectively.

FIGS. 7A-7B show an embodiment of a single link 112 of the robot 110. Link 112 comprises a rectangular cuboid body comprising distal and proximal surfaces extending therefrom that assist in connecting with adjacent links in a supportive and stable manner. The link 112 comprises a flat surface 115 having a thickness, extending distally from the body of the link 112. Flat surface 115 preferably comprises a round half circular shape and an aperture 115*a* at the circle center.

FIG. 7B shows another angle of the embodiment of FIG. 7A. The link 112 comprises a flat surface 117 having a thickness, extending proximally from a top surface of link 112. Flat surface 117 is on a plane that is parallel to the plane that surface 115 is on. Flat surface 117 is paced above the plane surface 115 is on. The link 112 comprises a flat surface 118 having a thickness, extending proximally from a low portion of link 112. Flat surface 118 is on a plane that is parallel to the planes that surfaces 117 and 115 are on, and is placed beneath the plane surface 115 is on. Flat surfaces 117 and 118 (which are parallel) each comprise an aperture 117a and 118a respectively (shown in FIG. 7C), being aligned with each other such that a shaft can be inserted therethrough.

The link 112 comprises two side channels 125 along the link 112 bottom portion sides thus forming a track/rail to enable the traveling of the wheels of the mobile actuator thereon. Link 112 is preferably symmetric (except for the torsion spring) and one channel will be explained here and it is correct for the other channel. The bottom of channel 125 is a surface 126. The top of channel 125 is a surface (not shown) aligned and in continuation with the bottom of surface 118 (wherein the connection between the links form a small gap between adjacent (distal-proximal) channels that do not affect the wheels traveling therein even in cases with a large angle between the links, thus a substantial continuous channel is formed).

Channels 125 further comprise an inward side wall surface 120 having a thickness, common to both side channels (and separates them from one another) extending along the length of link 112. Side wall 120 distal end is placed beneath the most proximal edge portion of aperture 115a. Side wall 120 proximal end is placed beneath the most distal edge portion of aperture 118a. Optionally, the channels 125 comprise two curved surfaces, one at the attachment line between side wall 120 and surface 126 and one between the attachment line between top surface of channel 125 and side wall 120.

The link 112 further comprises two proximal side ears 130 that extend upwards from the top of link 112 (at the proximal side of the link, distally to surface 117). Each side ear 130 comprises an aperture (not shown). The apertures are aligned with one another. A shaft 132 is inserted within both apertures. A torsion spring 140 is mounted on the shaft 132 between side ears 130.

A fixation element 141 rests on a portion of surface 117 and is connected to the shaft 132 by means of two arms 142 extending distally from the main body portion of fixation element 141. The arms 142 each comprise apertures at their distal ends that are aligned with one another. Shaft 132 passes through the apertures of arms 142 such that each of them is placed between one of the ears 130 and one side of the torsion spring 140. Thus the fixation element 141 is movable around the axis of shaft 132.

Fixation element 141 comprises a proximal holding element surface being a clamp 141e (having a thickness) extending (preferably proximally and then) downwards from the fixation element 141 proximal end. The bottom of clamp 141e is configured to engage the top of its proximal adjacent link 112 and apply pressure by pushing down on it such that it maintains fixation and is secured tightly and fastened, i.e. such that the position between the adjacent links is maintained (by preventing movement between the clamp 141e and the top of its proximal adjacent link 112). One end of the torsion spring is fixed to surface 117. FIG. 7C shows a protruding section 144 comprising a hollow bore 145 for receiving one end of the torsion spring 140 being fixed thereto. Fore simplicity, the torsion spring 140 is not shown in FIG. 7C. The other end of the torsion spring 146 (FIG. 7A) is placed above fixation element 141 such that the torsion force applies a downward force to it.

Optionally said other end of the torsion spring 146 is placed in a receiving channel 147 on top of fixation element 141 for a better fixation. The torsion spring 146 applies a strong downward force on fixation element 141 such that is presses down on the top of proximal link 112 maintaining its adjacent link's position one in relation to the other.

Optionally To increase the friction force sand papers may be attached to the top of links 112 (at the areas that engage with the clamp 141e) and a metal screw attached to the clamp, engageable with the sand papers.

Figure 7D:
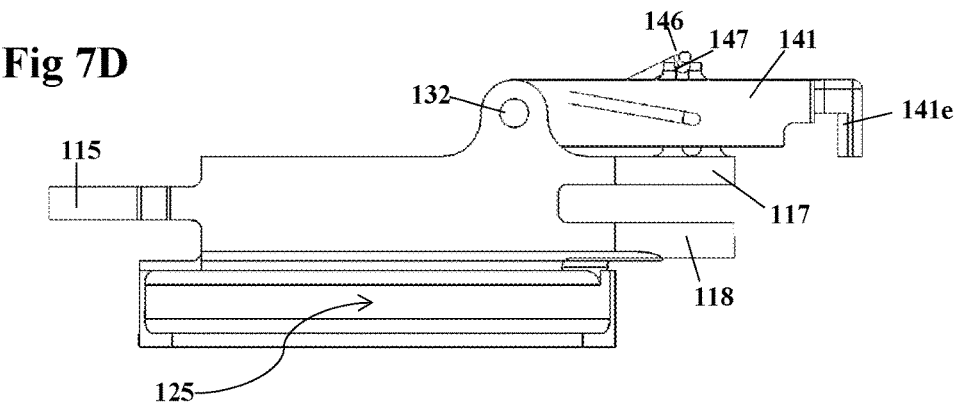
FIG. 7D illustrates a side view of the torsion spring link according to an embodiment of the present invention.
Figure 7E:
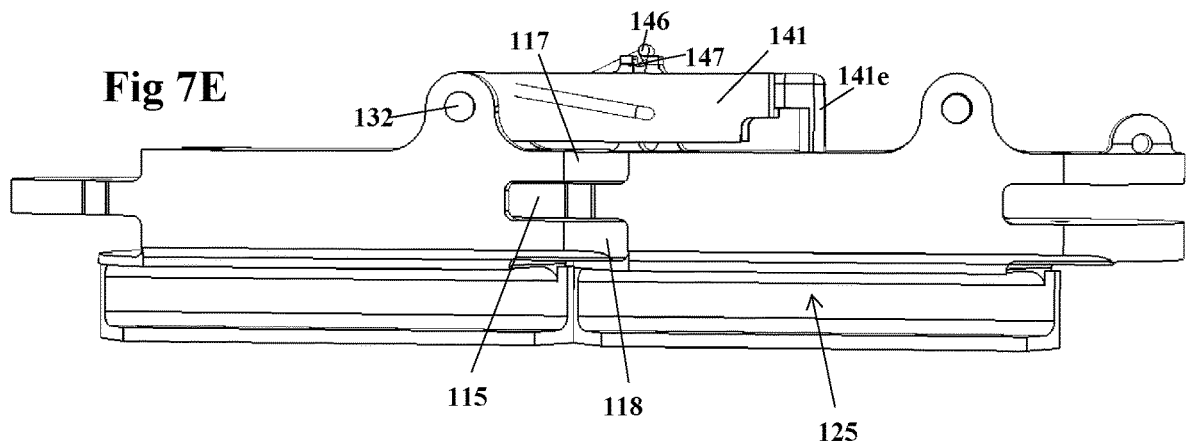
FIGS. 7E-7F illustrate different angles of two adjacent links of the torsion spring embodiment of the present invention.
Figure 7F:
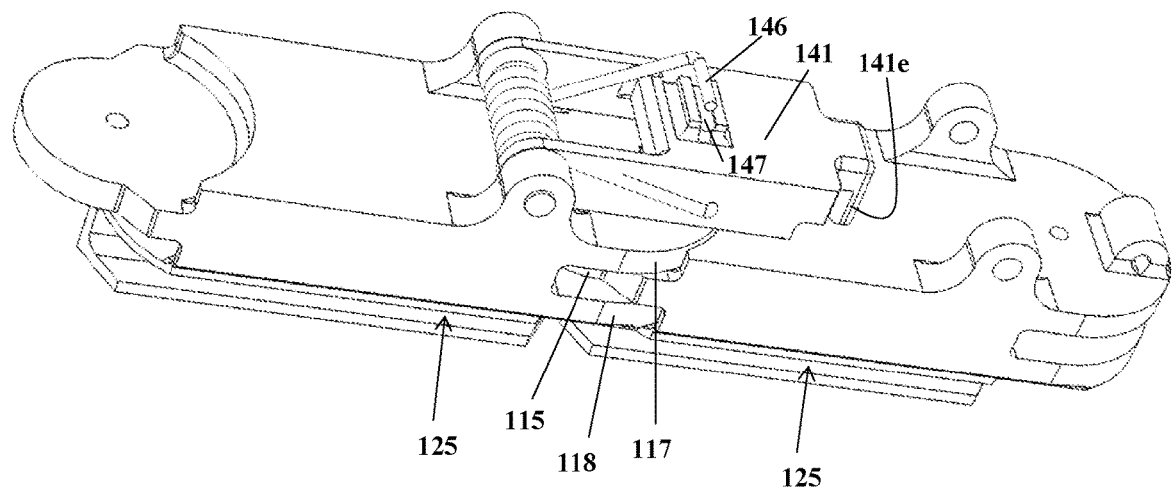

FIG. 7D shows a side view of link 112. FIGS. 7E and 7F show a side view and a diagonal view of two adjacent links 112 respectively where the respective heights of the parallel surfaces can be seen. For simplicity, only the connection portion including the distal portions of the proximal link and the proximal portions of the distal link are numbered. The adjacent links are connected such that the following apertures are aligned from top to bottom—117a (of distal link), 115a (of proximal link) and 118a (of distal link). A connecting shaft (not shown) is inserted through all three apertures connecting the links together allowing the joint angle between the links to vary, thus being a rotational joint wherein the distal link is rotationally displaceable (with respect to the axis being the shaft) in relation the proximal link.

With respect to two connected adjacent links, preferably, the thickness of surface 115 (of the distal link) is such that it is tightly fitted between surface 117 (of proximal link) and surface 118 (of proximal link). Preferably the thickness of surface 118 (of distal link) is tightly fitted within the space between surface 115 (of the proximal link) and the top of wall 120 (of the proximal link). These tight fittings contribute to the stability of the connection of the links and to the joint angle change while maintaining a position on the same aligned plane.

Preferably, at the connection area between two adjacent links, the space between surfaces 117 and 115 is curved and complementary to surface 115. Preferably, the space between surface 115 and top of wall 125 is curved and complementary to surface 118.

Figure 8A:
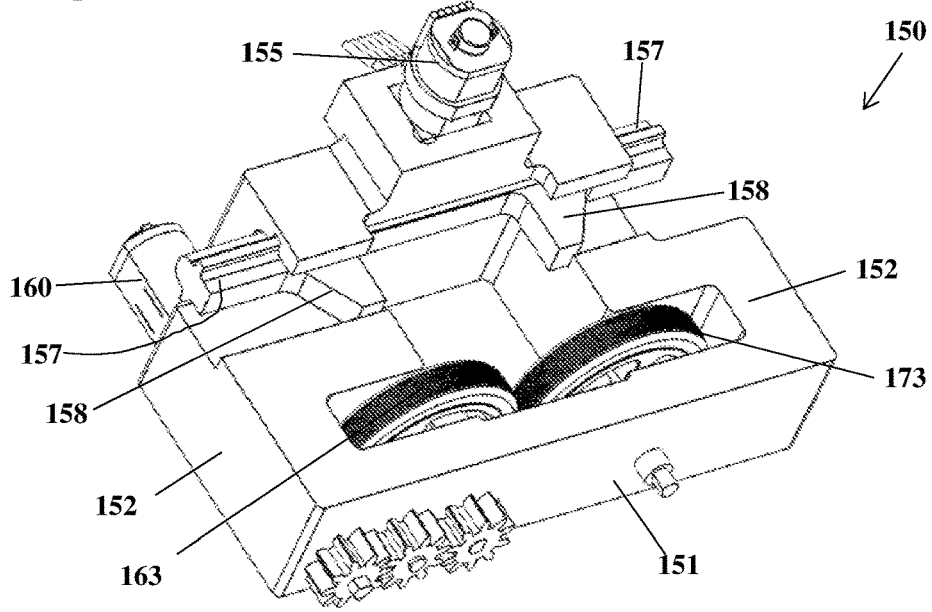
FIGS. 8A-8C illustrate different angles of an embodiment of the mobile actuator of the present invention.
Figure 8B:
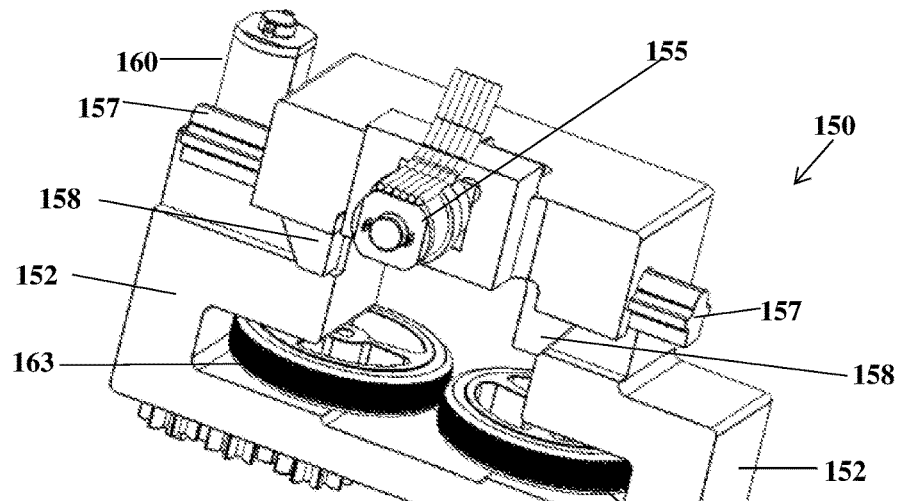
Figure 8C:
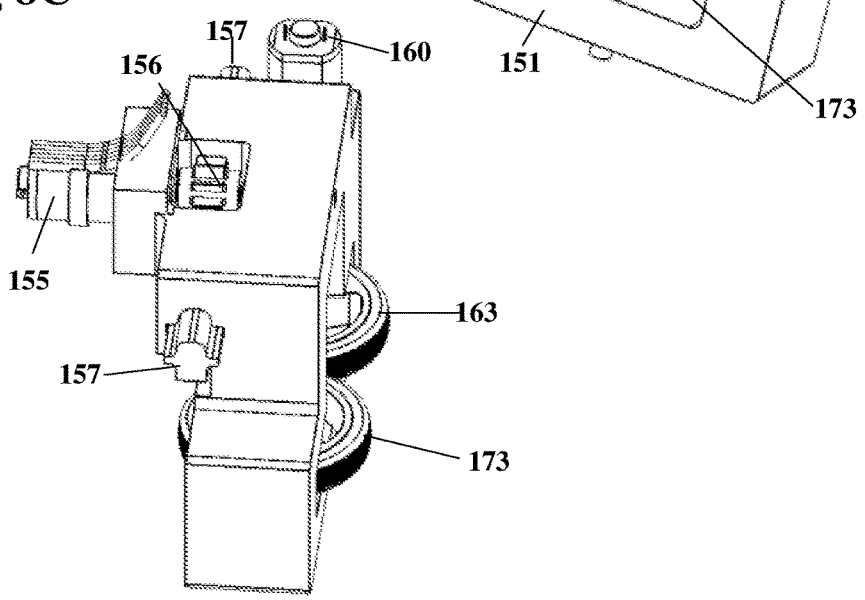

FIGS. 8A-8C show an embodiment (at different angles) of the mobile actuator 150 movable on the connected links. The mobile actuator 150 is hollow and when in motion the connected links pass through the hollow portion. The connected links are surrounded by the mobile actuator 150 elements. Mobile actuator 150 comprises a bottom surface 151 having a thickness and two side arm surfaces 152 having a thickness, extending upwards from the sides of surface 151. The top portion of mobile actuator 150 comprises a rack and pinion mechanism. The mobile actuator 150 comprises a first motor 155 configured to generating rotational movement. The motor 155 is connected to the top portion and is fixed thereto (typically passing through the top portion and protruding outwards). The motor 155 is configured to rotate the pinion element 156 (of the rack and pinion mechanism) which moves the rack element 157 accordingly. The pinion element 156 and the rack element 157 are a pair of gears which convert rotational motion into linear motion. The circular pinion element 156 engages teeth on a linear "gear" bar being the rack element 157. Rotational motion applied to the pinion element 156 causes the rack element 157 to move relative to the pinion, thereby translating the rotational motion of the pinion into linear motion.

FIGS. 8D-8F show the rack and pinion mechanism elements. The pinion element 156 has a circular shape and comprises peripheral teeth at its edge. The rack element 157 is straight and comprises teeth on its top portion that mesh with the pinion teeth. When the pinion element 156 is rotated its teeth (meshing with the rack 157 teeth) move the rack 157 sideways either to the left or right depending on the rotation direction. The rack element comprises two spaced apart protrusion elements 158 extending downwards therefrom. The protrusion elements 158 are spaced apart such that top portions of the links 112 can pass therebetween when mobile actuator 150 is in motion. FIG. 8G shows an example of motor 155 with a rotating shaft cross-section configured to being tightly fit with the pinion's 156 inner aperture (FIG. 8H) and rotate the pinion 156.

The mobile actuator 150 is engageable with a position-determining element being clamp 141e. When the mobile actuator 150 is in position to change the angle between two links 112, the motor 155 rotates the pinion 156 which moves the rack 157 sideways thus one of the protrusion elements 158 pushes the clamp 141e sideways thus changing the angle (around the connecting shaft axis) between two adjacent links 112. Actually the distal link and thus the entire robot 110 from the distal link distally onward changes its angle according to how much the protrusion elements 158 pushes. It should be noted that the motor 155 force that causes the protrusion elements 158 pushing, is greater than the torsion force (of the torsion spring 140) that pushes down on the proximal link top portion for fixation. After the rotation/pushing is carried out and a desired angle between the links is obtained, the rack 157 is returned such that the protrusions are placed such that top portions of the links 112 can pass therebetween when mobile actuator 150 is in motion. When wanting to change the angle in the opposite direction—the motor 155 rotates in the opposite direction and thus the rack 157 moves sideways in the opposite direction and thus the other protrusion 158 moves the clamp 141e sideways in the opposite direction causing an angle change in the opposite direction.

The mobile actuator 150 further comprises a second motor 160 configured to generate rotational movement for causing spinning motion of wheels that cause the traveling of the mobile actuator 150 distally and proximally along the connected plurality of links 112. Optionally, the motor 160 may be connected to the bottom surface 151 and is fixed thereto (typically passing through the surface 151 and protruding downwards), in a similar manner as in the embodiment of motor 60. Optionally, the motor is placed on the top of mobile actuator 150 (like in FIGS. 8A-8C) and rotates a first gear which rotates a second gear which rotates a third gear (shown on the bottom of mobile actuator 150 in FIG. 8A). The third gear may be equivalent to the lower wheel gear 64 that rotates the wheel 163, in a similar manner as explained hereinabove relating to motor 60 and wheel assembly 62 mutatis mutandis.

The mobile actuator 150 comprises a second wheel 173 mounted at its center on an axle pin (not shown) fixed to the surface 151 (said axle pin extending upwards) and configured to spin around the axis of the axle pin. Both upper wheels 163 and 173 are positioned horizontally.

The wheels 163 and 173 have a circular shape and are configured to enter channels 125 along both sides of wall 120 of the links 112 and travel along it within them (when spinning). When motor 160 rotates wheel 163 in one direction the mobile actuator 150 travels distally, and when motor 160 rotates wheel 163 in the other direction the mobile actuator 150 travels proximally. According to one embodiment, the side wheels 163 and 173 are mounted such that they (preferably tightly) press wall 120 when mobile actuator 150 travels on the links 112 (and the same for the three wheels configuration of FIGS. 3A-3B) contributing to efficient maneuverability.

Figure 9A:
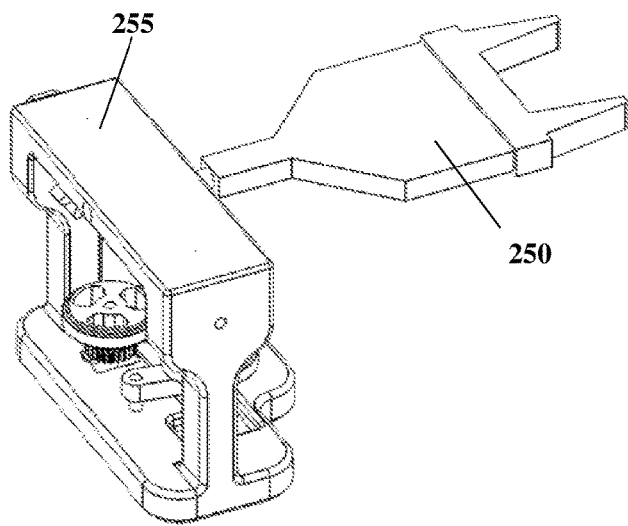
FIGS. 9A-9C illustrate different angles of an embodiment of the mobile actuator of the present invention.
Figure 9B:
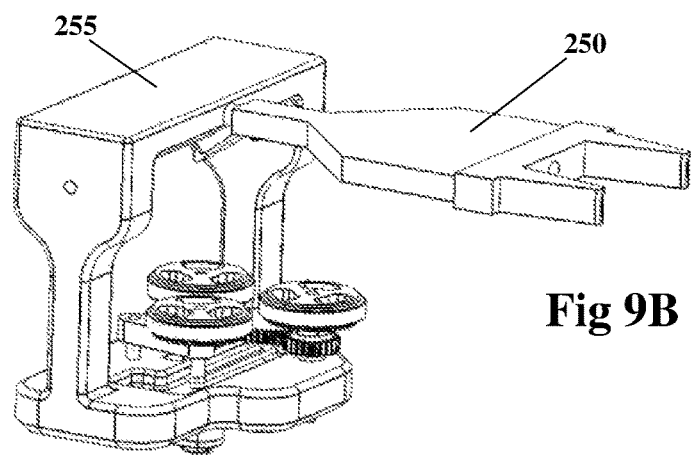
Figure 9C:
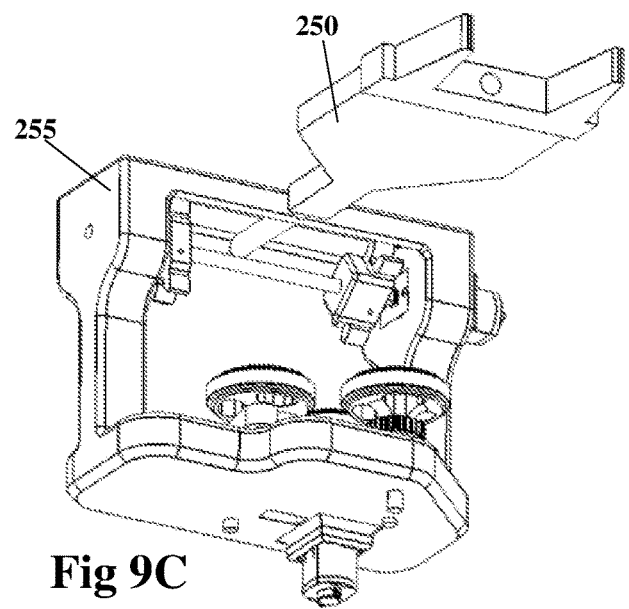

FIGS. 9A-9C show an embodiment of a mobile actuator comprising a gripper 250. The gripper 250 according to this embodiment is connected to a supportive top portion 255 of the mobile actuator. The use of the gripper could be for obtaining an item at the distal end of the robot.

According to another embodiment of the present invention, other elements (e.g. a magnet, a welding power supply (welding unit), a scissors, an illumination unit, etc.) may be connected to the mobile actuator. This is advantageous as the robot links (after the distal link is positioned in the required location) remain in their position without needing to change their position, while the mobile actuator carries the elements for use at the distal destination and back to the proximal base. This may be advantageous as there is no need to move links which saves in maneuvering/energy, and may be faster.

Optionally, the base 4 may connect to a stable end effector of an additional robot or to a movable actuator of an additional robot.

The maneuvering of the MASR may be according to a joystick, e.g. a two channel joystick, one channel used to drive the mobile actuator forward and backward along the links and the other to rotate the links clockwise or counter clockwise. According to this embodiment the mobile actuator comprises a receiver to receive the joystick commands and a controller coupled thereto that is coupled to the motors for providing the operational joystick commands to the motors. The user decides in real time which joint to adjust and how much to adjust it.

According to another embodiment of the present invention, the maneuvering of the robot is carried out by a motion planning. In this embodiment the mobile actuator comprises a processing unit (e.g. processor, controller) that comprises a memory for storing and carrying out operational commands to the motors of the mobile actuator for traveling to the required joints and carrying out the required positioning between the desired relative links. The processing unit is coupled to the motors of the mobile actuator. Optionally the processing unit is also coupled to a receiver configured to receive operational commands regarding the links positioning and control the motors accordingly.

According to one embodiment, the memory remembers all the history of the adjusted links position and carries out the new commands in accordance with the current position state of the joint (that has been stored in the memory).

According to another embodiment of the present invention, the mobile actuator and the links comprise position encoders (e.g. angle transducers/sensors) for determining the current position between the links. The position data is received from encoders, e.g. a rotary encoder (a shaft encoder) configured to detect the angular position between two adjacent links. For example an encoder unit comprising one identifiable element attached on one link (e.g. on its proximal side) and another identifiable element on the adjacent link (e.g. on its distal side). The encoder sensor, attached to the mobile actuator, reads the relative angle between those two parts when arriving at the joint between the links.

According to this embodiment, it is enough for the memory only to remember the requested current angles without needing to remember the link positioning history since the requested joint angle (to be adjusted) can be read and adjusted in accordance with the current reading.

The mobile activator and the links may comprise elements of a linear encoder so that the mobile actuator can travel to the precise location on the joint in order to carry out the position adjusting. The mobile actuator comprises a sensor/transducer or readhead that can be paired with a scale that encodes position/location. When the sensor reads and acknowledges the scale it informs the controller which stops the motor driving the mobile actuator, thus the mobile actuator stops. The sensor may be placed at a location across from a corresponding scale on the link where it can read said corresponding scale on the link. For example, the sensor (also coupled to the processing unit/controller) may be placed on top of surface 51 facing upwards and the corresponding scales (each scale may have a different reading indicating a different joint/link) may be placed beneath surface 18 facing downwards such that they become aligned when the mobile actuator is in a position engageable with a position-determining element (gear wheels 35, clamp 141*e*) of the respective link. Optionally a dedicated sensor may be used for the linear scale and the position/angle encoding.

According to another embodiment of the present invention, the mechanical mechanisms causing the positioning between adjacent links can vary (e.g. based on revolute, spherical, planar, cylindrical, edge slider, point slider mechanisms etc.).

According to an embodiment of the present invention, the orientation between two adjacent links may be adjusted by the mobile actuator in the three dimensional space (e.g. sideways horizontally and also vertically). The motion of the robot can be extended into three dimensional space. This can be achieved in multiple methods. Optionally, this can be carried out without modifying the mobile actuator and by fixing some of the axes of the joints to be non-parallel to each other. This will allow to move out of the imaginary plane that the links are disposed on (as explained herein). An optional embodiment may include the axes of two successive joints being perpendicular to each other.

Another embodiment comprises the joints of the links having more than one degree of freedom such as a U joint of spherical joint. In such a case the mobile actuator will be fitted with two or three motors (excluding the motor that advances over the links) to actuate the U joints of the spherical joints.

Other embodiments may include one motor for the horizontal axis (e.g. the motor powers a gear engageable with a horizontal position-determining element on the link moving the distal link sideways on the same imaginary plane as described hereinabove) and another motor that powers an element (e.g. an additional gear at a different place on the link) engageable with a vertical position-determining element on the link (at a corresponding place) that is configured move the link vertically (e.g. moving the distal link upwards/downwards on the vertical axis). Other embodiments may include one motor for the horizontal and vertical positioning wherein the engageable element powered by the motor engages the horizontal position-determining element at a certain location about the joint and engages the vertical position-determining element at a different location about the joint. Appropriate encoders (e.g. as explained herein) are provided at the necessary locations so that the mobile actuator will stop at the appropriate locations to activate the desired actions.

A non-limiting example may be the worm gear mechanism explained hereinabove further comprising a vertical half worm wheel on a proximal link meshing with a corresponding vertical worm screw on its distal adjacent link. This example comprises three motors, one for driving the mobile actuator, the second for rotational displacement on the same plane (as in the embodiment explained hereinabove) and the third motor powering a gear that meshes with additional wheel gears that activates the vertical wheel gear mechanism, thus repositioning the distal link upwards or downwards (on the vertical axis) in relation to the initial imaginary plane the links were disposed on.

Optionally the actuator may distance two adjacent links from each other or bring them closer together based on a prismatic joint mechanism.

According to an embodiment of the present invention, worn out motors may be easily replaced with new stronger motors. Optionally, the motors may be chargeable and thus recharged.

The present invention may be comprised of various materials according to a dedicated application. For example, the links (including surfaces) may be comprised from plastics or 3D printing materials, e.g. Verogray material (for example by using an Objet Connex 350 3D printer). The gears (e.g. gear wheels) may be comprised of plastics. The wheel arrangements may be comprised of plastics. The wheel portions that engage the channels (e.g. 63, 73, 163, 173) and travel therethrough may comprise tires comprising rubber. The Actuator arms and bottom surface, the worm screw and the Rack 157 and Pinion 156 elements are preferably comprised of plastic. The shafts 32, 132, 39, 54, the fixation element 141 and torsion spring are preferably comprised of steel.

The sizes of the robot may vary from millimeters to dozens of meters. For some specific applications the length of each link may be from 3 cm to 10 cm, or from 10 cm to 15 cm, or from 15 cm to 20 cm. The elements of the link and the size of the mobile actuator may vary accordingly.

The motors of the present invention may be, for example, Pololu—1000:1 Micro Metal Gearmotor HPCB 12V with Extended Motor Shaft. The battery powering the motor may be, for example, Lithium Ion batteries 3.7 Volts.

The controller of the present invention may be, for example, teensy 3.2. The encoder assembly of the present invention may be, for example, Pololu—Magnetic Encoder Pair Kit for Micro Metal Gearmotors, 12 CPR, 2.7-18V (HPCB compatible).

Examples with Highly Redundant Configurations

Example 1

Figure 10:
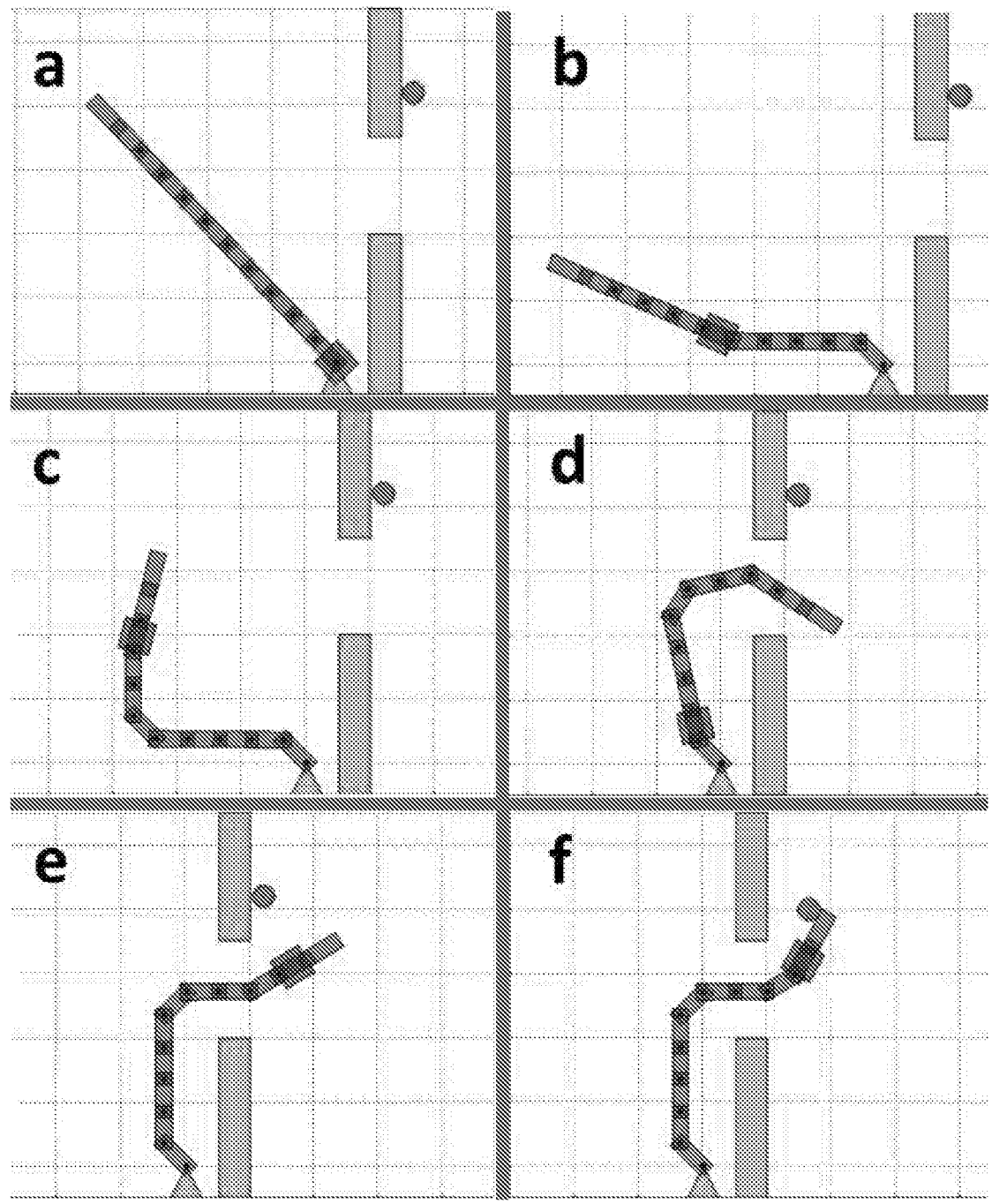
FIG. 10 illustrates an example of use according to an embodiment of the present invention.

To demonstrate the capabilities of the MASR, a motion planning situation was simulated with obstacles as summarized in FIG. 10. The planning was performed by a human operator. The MASR in this example comprises a base and ten links and joints (10 DOF) actuated by one mobile actuator. The goal of the robot is to grab the circle and bring it back to the robot's original configuration.

The task is composed of two main challenges. The first is going through the narrow pass of 15 cm, and the second is reaching the target with the small section of the robot that went through the opening. Throughout the whole task, the robot must avoid colliding with the obstacles.

The robot accomplishes this task by having the mobile actuator translate and adjust the angles of the joints one at a time. The robot first passes through the narrow pass by transforming its second half into an arc like shape. Then, the mobile actuator passes through the pass and then rotates the links to reach the target. Since four joints and links went through the pass, the robot had four degrees of freedom to reach its target (only three are required in a 2D space to reach location and orientation). In total, only eight translational steps for the motor are required in each direction, demonstrating the dexterity and maneuverability of the MASR.

TABLE 1

Motion Summary of MASR. During each action, the
mobile actuator rotates a specific joint by an angle θ or
advances from joint (start) to another (end).

| STEP | Turning [degrees] (joint/angle) | Translation (start-end) |
|---|---|---|
| Reaching the target | | |
| 1 | +45 | (1-1) |
| 2 | +45 | (1-2) |
| 3 | −45 | (2-6) |
| 4 | −45 | (6-7) |
| 5 | −45 | (7-9) |
| 6 | −45 | (9-2) |
| 7 | +45 | (2-9) |
| 8 | +30 | (9-10) |
| Returning after grasping | | |
| 9 | −75 | (10-10) |
| 10 | −60 | (10-9) |
| 11 | +90 | (9-2) |
| 12 | +30 | (2-10) |
| 13 | +30 | (10-9) |
| 14 | +45 | (9-7) |
| 15 | +45 | (7-6) |
| 16 | −45 | (6-2) |
| 17 | −45 | (2-1) |
| total (absolute) | 840 [degrees] | 48 L |

As shown in Table I, each stage of motion consists of rotating the given joint by the turning angle, then translating the actuator to the desired joint, and repeating the process. There are a total of eight actions required to reach the object, one action to grasp it, and another eight actions required to return to its initial state with the grasped object in hand.

FIG. 10 shows snapshots of the animation of MASR equipped with a single mobile actuator reaching its target. Starting at (a), the mobile actuator advances to the center after rotating the base link (b). At (c), the mobile actuator rotates the six top links to make an arc shape and then returns to the base (d) to rotate the links and penetrate through the small cavity. The actuator travels again to the top links to rotate them towards the target (e). After reaching its target, the robot makes the inverse plan of a-b-c-d-e to return to its original configuration (f).

The bottom row of Table I shows that the sum total of degrees that the links rotate equals 840°, and the actuator translates a total of 48 link-spans. The total time of the maneuver thus equals the time required to perform both modes of action.

Example 2

To prove the feasibility of the MASR, a mobile actuator was designed and manufactured, with 10 links and a base. The robot parts were 3D printed using Object Connex 350 with nominal accuracy of nearly 50 microns using "Verogray" material. In this version, the joint angle is passively locked by a spring applying a friction force. To increase the friction force sand papers were glued to the links and a metal screw was attached to the clamp. FIG. 11A shows a top and bottom view of two adjacent links. The relative orientation between the links is passively fixed by the clamps. At their bottom, the links have a track which allows the mobile actuator to travel along them to reach and actuate a desired joint. Each of the links is 2 cm wide and 5 cm long, giving the active section of the snake robot a total length of 50 cm. The weight of the mobile actuator is 102 grams, whereas the average weight of a links including the clamp and joint is nearly 25 grams. A magnet was attached to the tip of the last link in order to grasp the target. However, other grasping mechanisms can be added.

The mobile actuator (shown in FIG. 11B) has two motors. One motor actuates the wheels to drive the mobile actuator along the tracks of the links (thus traveling upon the links), and a second motor to rotate the links. The rotational motor is attached to a linear gear mechanism (rack and pinion), allowing the teeth to disconnect from the links or push them for rotation. The maximum relative angle between the links is 45 degrees. A 4 Volts Lithium-ion battery was used to actuate the motors. The speed of the locomotion is nearly 3 cm/s and the rotational speed is nearly 18 degrees/s. The robot is very modular and the number of mobile actuators and links is easily changeable. Motors with 1000:1 gear ratio were used which can produce 0.9 Nm of torque at 32 rpm. This torque is necessary to overcome the friction torque between the different links and other external forces to produce motion.

During all of the experiments, the mobile actuator was remotely controlled by a human operator. The operator had a two channel joystick. One channel was used to drive the mobile actuator forward and backward along the links and the other to rotate the links clockwise or counter clockwise.

The system is passively locked with friction and the mobile actuator fitted with a strong motor overcomes the friction to rotate the links.

Example 3

In order for the robot to operate as planned, it must be able to perform the following mechanical operations:
1. Travel freely over the links forward and backward.
2. Travel over curved joints without changing their orientation (the links are passively locked).
3. Rotate the links.

Figure 12A:
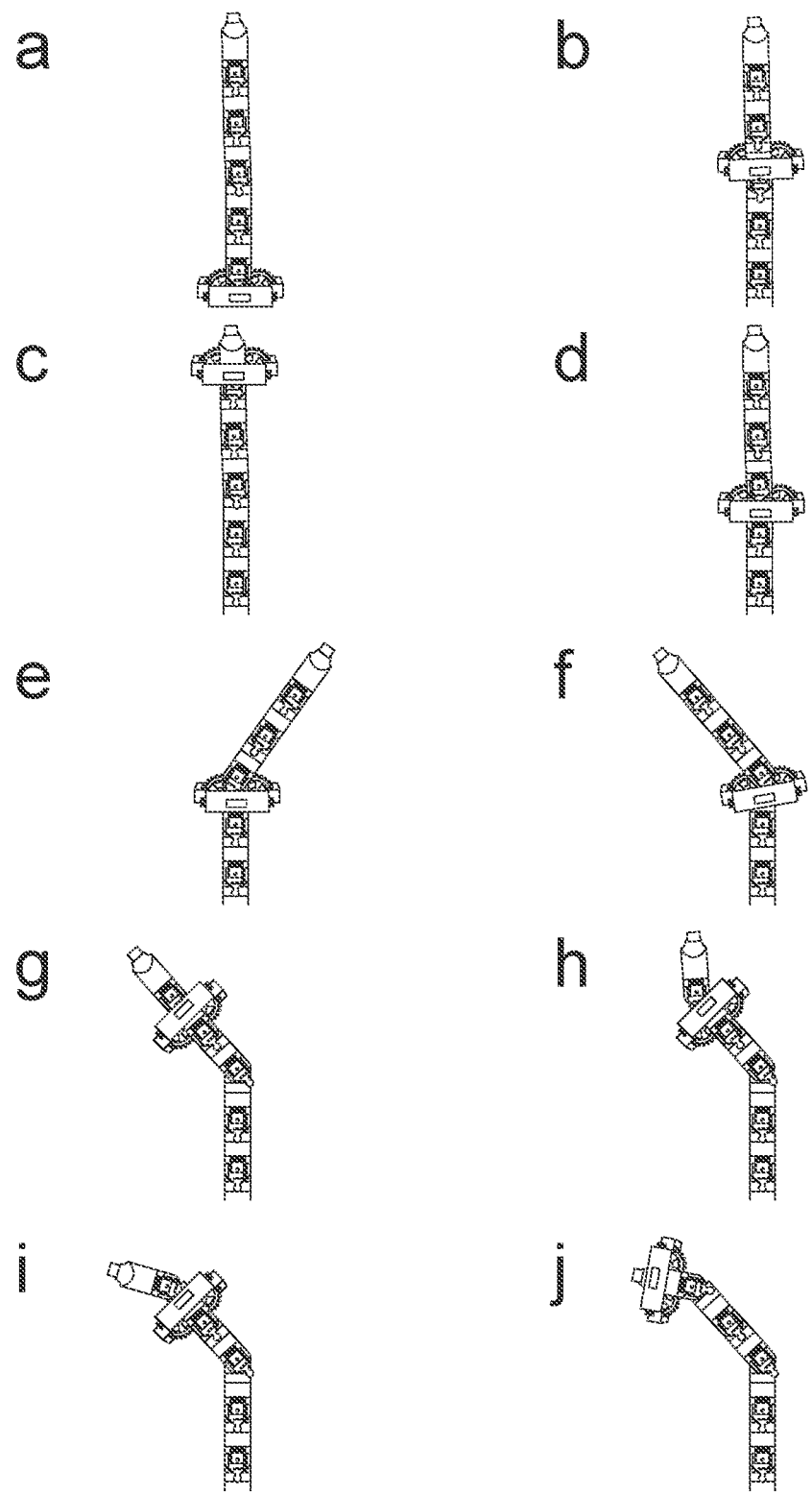
FIG. 12A illustrates an example of use according to an embodiment of the present invention.

The basic experiment is presented in FIG. 12A. The mobile actuator was tested going towards the end of the links and returning back with and without bending the links. In both cases, the robot had no difficulty travelling over the links or rotate them to either direction.

Starting at (a), the robot advances towards its tip (b-c), then returns to the center (d). The robot then rotates the links clockwise (e) and counter clockwise (f). The robot then travels over the curved joint (g) and rotates its tip clockwise (h) and counter clockwise (i). The robot then moves to the tip (j).

Figure 12B:
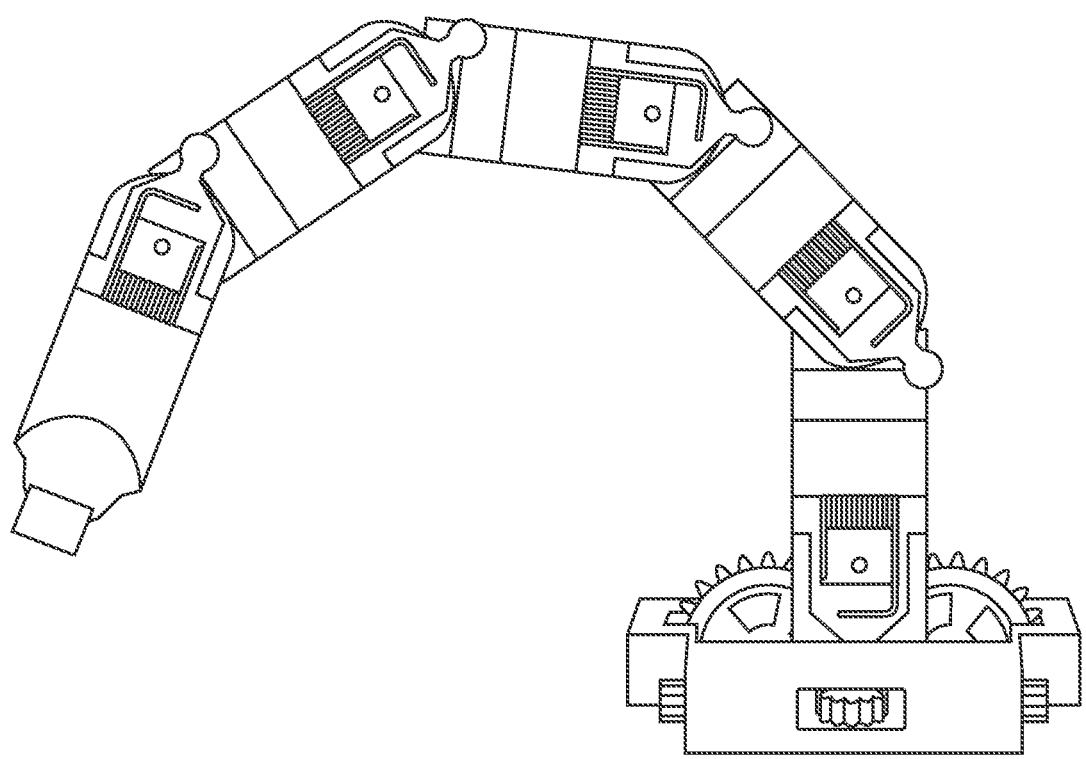
FIG. 12B illustrates an example of use according to an embodiment of the present invention.

As the joints can be rotated by 45 degrees to each direction, the robot can make a "C" shape (half a circle) by rotating 4 links in the same direction (counter clockwise). This experiment is illustrated in FIG. 12B.

Example 4

Figure 13:
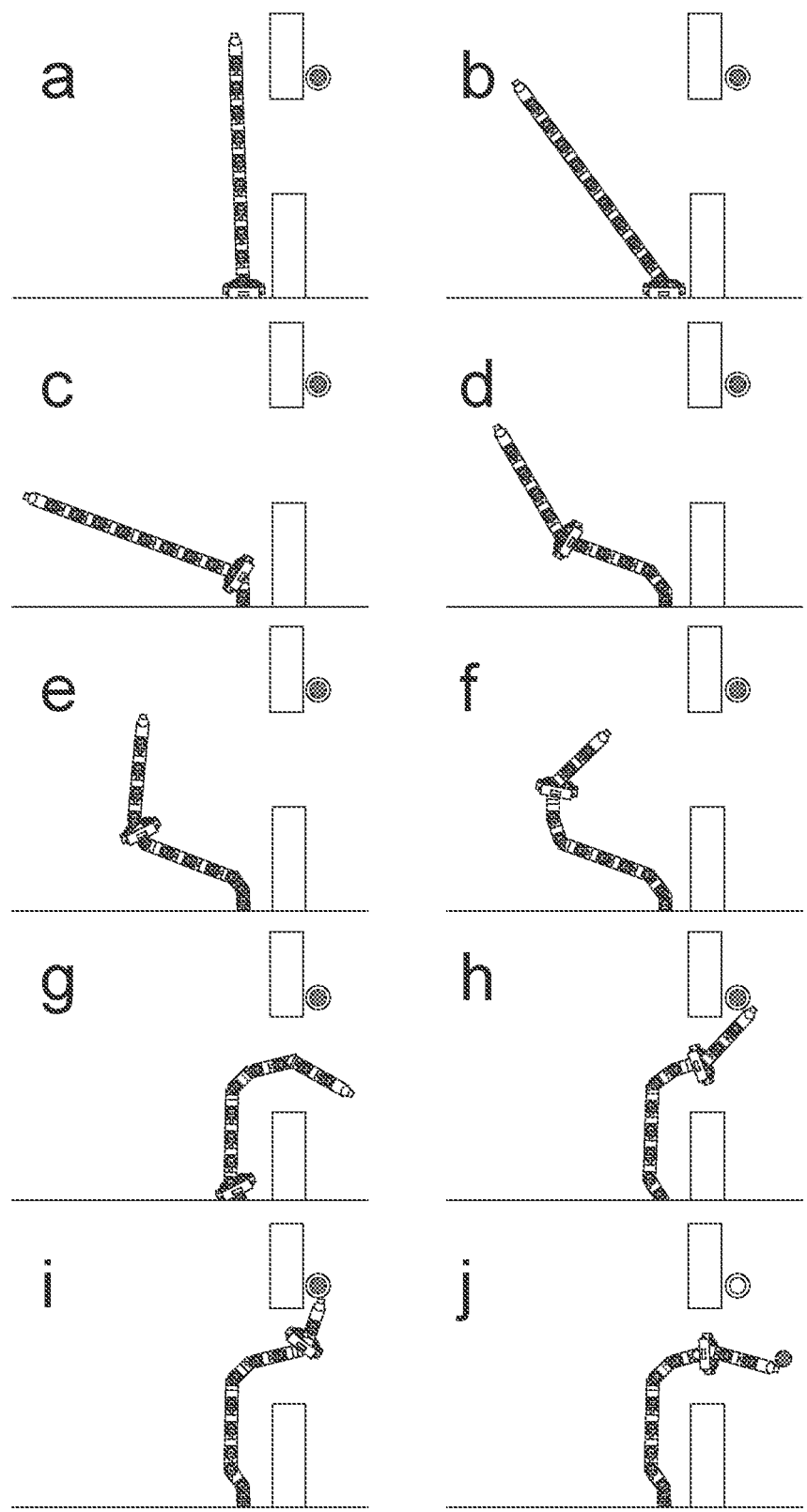
FIG. 13 illustrates an example of use according to an embodiment of the present invention.
Figure 13:
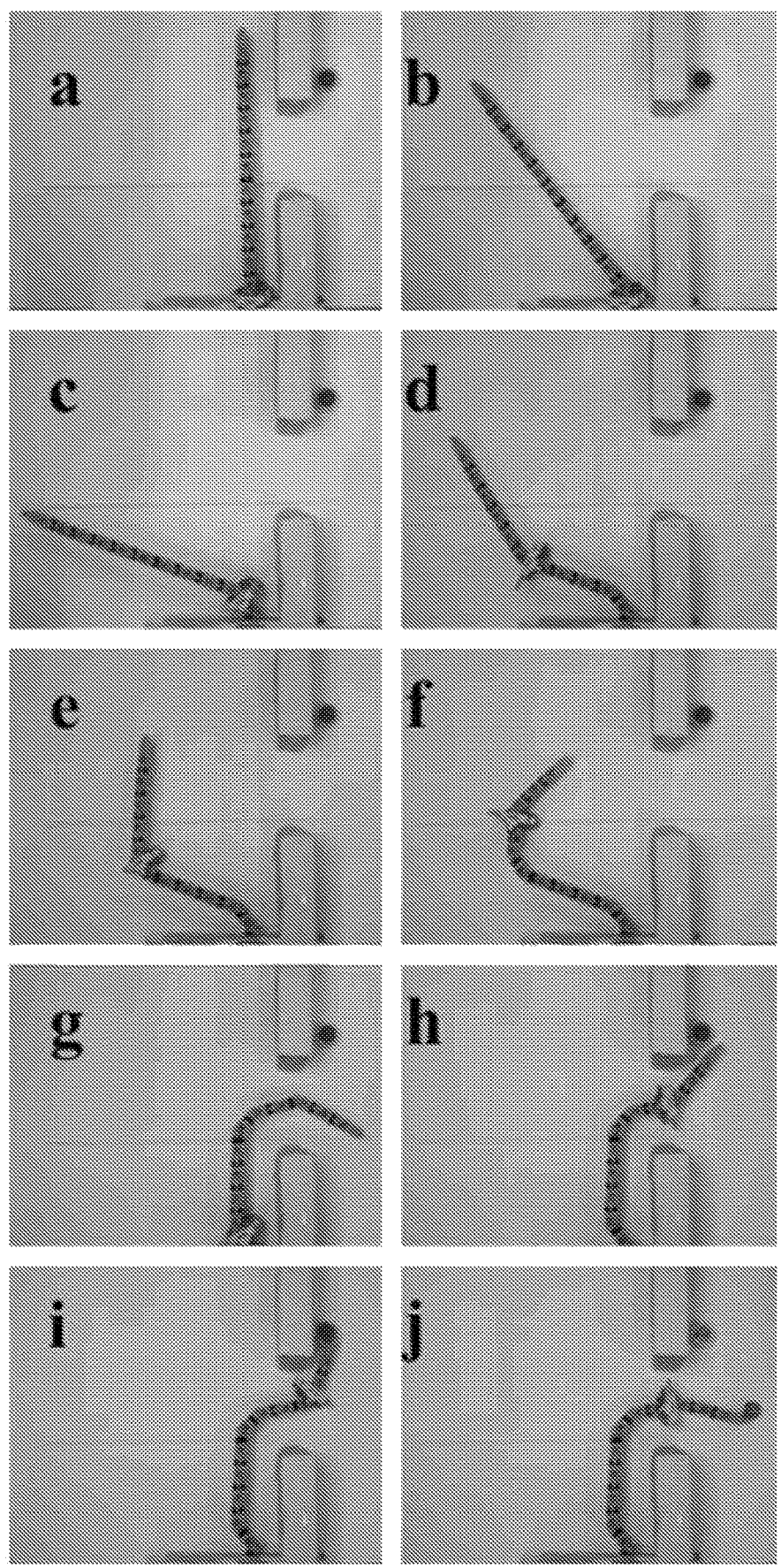

FIG. 13 shows the robot penetrating through a small pass to reach a target behind the wall. In the following experiment, the robot comprises 10 links. The robot is very modular and adding additional links can be done very fast. With this longer version, a task was performed in a similar manner to that of the example relating to FIG. 10.

Following a similar algorithm, the robot successfully reached its desired target. However, it was found that since the robot is made of printed material, it slightly cured downwards by nearly 1 cm. Even though the weight of the robot is larger and the torque acting on the links substantially increased, the links remained locked during the experiment.

Example 5

Figure 14:
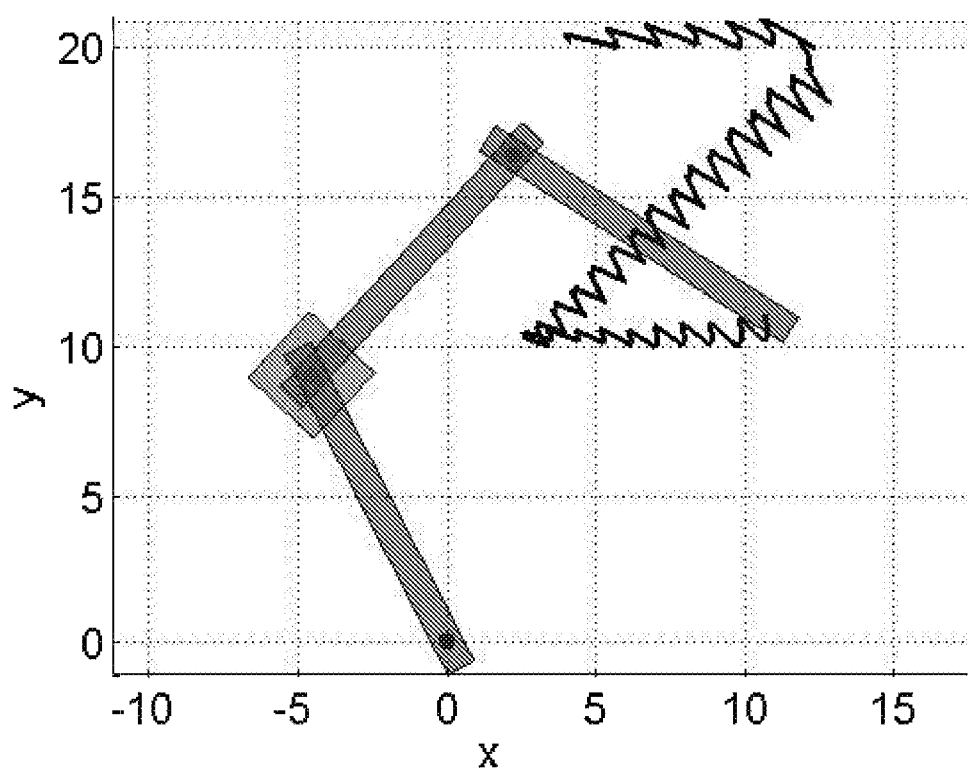
FIG. 14 illustrates an example of use according to an embodiment of the present invention.

A snapshot of the MASR end effectors attempting to draw the letter Z (under maximum angular deviation of 5=0.2 rad) is shown in FIG. 14. For robot applications where the end effectors are tasked with tracing a path, this result has significant implications for the selection of actuators of the MASR. The actuator, represented by the rectangle (at the left joint), translates from joint to joint.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A robot device comprising:
a chain comprising a plurality of connected links, each pair of adjacent links of said plurality of connected links define a respective joint therebetween;
a mobile actuator movable on said chain when said chain is stationary, the mobile actuator configured to travel on said chain to a given joint of the respective joints and change an angular orientation of one of the plurality of connected links forming said given joint relative to an adjacent one of the plurality of connected links that also forms said given joint;
wherein said mobile actuator comprises at least a first motor to drive the mobile actuator such that the mobile actuator travels along said plurality of connected links; and
wherein said mobile actuator is engageable with a position-determining element.

2. The robot device according to claim 1, wherein the mobile actuator includes a second motor, the second motor is configured to change the angular orientation of the one of the plurality of connected links relative to the adjacent one of the plurality of connected links.

3. The robot device according to claim 1 comprising a worm gear mechanism, the worm gear mechanism interacting with the mobile actuator to change the angular orientation of the one of the plurality of connected links relative to the adjacent one of the plurality of connected links.

4. The robot device according to claim 1, wherein the one of the plurality of connected links includes an aperture in a surface, the adjacent one of the plurality of connected links includes an aperture in a surface, a shaft is inserted into the apertures of the one and the adjacent one of the plurality of connected links connecting the one of the plurality of connected links to the adjacent one of the plurality of connected links.

5. The robot device according to claim 1 comprising a worm gear mechanism, the worm gear mechanism interacting with the mobile actuator to change the angular orientation of the one of the plurality of connected links relative to the adjacent one of the plurality of connected links;
wherein the worm gear mechanism comprises a worm screw disposed on the one of the plurality of connected links that engages with a worm wheel surface extending distally from the adjacent one of the plurality of connected links.

6. The robot device according to claim 5, wherein the worm screw is mounted on a rotatable horizontal shaft fixed on the one of the plurality of connected links.

7. The robot device according to claim 6, further comprising at least one wheel gear fixedly mounted on the rotatable horizontal shaft such that when the at least one wheel gear rotates the rotatable horizontal shaft rotates.

8. The robot device according to claim 7, wherein the mobile actuator comprises a horizontal rotatable axle mounted thereon and at least one spinning gear element fixedly mounted on said horizontal rotatable axle such that the at least one spinning gear element is engageable with the at least one wheel gear.

9. The robot device according to claim 8, the mobile actuator further comprising a second motor, the second motor configured to generate a rotational movement that rotates the horizontal rotatable axle.

10. The robot device according to claim 1, wherein each of the one and the adjacent one of the plurality of connected links includes two side channels along a respective length thereof;
wherein each of the two side channels of the one of the plurality of connected links is substantially continuous with a respective corresponding one of the two side channels of the adjacent one of the plurality of connected links forming a respective track;
wherein the mobile actuator comprises two wheels mounted thereon, each of the two wheels configured to drive along a respective one of the respective tracks.

11. The robot device according to claim 1, wherein the plurality of connected links are disposed on an imaginary plane; and
wherein the change in angular orientation of the one of the plurality of connected links relative to the adjacent one of the plurality of connected links is such that one of the one and the adjacent one of the plurality of connected links is rotationally displaceable about an axis substantially perpendicular to said imaginary plane.

12. The robot device according to claim 1, wherein the mobile actuator includes a rack and pinion mechanism, wherein the rack and pinion mechanism is configured to change the angular orientation of the one of the plurality of connected links relative to the adjacent one of the plurality of connected links.

13. The robot device according to claim 1, wherein the mobile actuator includes a rack and pinion mechanism, wherein the rack and pinion mechanism is configured to change the angular orientation of the one of the plurality of connected links relative to the adjacent one of the plurality of connected links;
wherein the one of the plurality of connected links comprises a fixation element extending proximally therefrom;
wherein said fixation element comprises a clamp extending downwards from said fixation element;
wherein said clamp is engageable with a top portion of the adjacent one of the plurality of connected links, pushing down on the adjacent one of the plurality of connected links maintaining fixation between the one and the adjacent one of the plurality of connected links.

14. The robot device according to claim 13, further comprising a torsion spring fixed at one end to a portion of the one of the plurality of connected links and fixed at another end on top of the fixation element such that the torsion force of the torsion spring applies a downward force causing the clamp to push down on the top portion of the adjacent one of the plurality of connected links.

15. The robot device according to claim 14, further comprising a rotatable horizontal shaft fixed to the one of the plurality of connected links;
  wherein the torsion spring is mounted on said rotatable horizontal shaft; and
  wherein the fixation element comprises at least one distal arm fixedly mounted on said rotatable horizontal shaft such that said fixation element is rotationally displaceable with respect to the axial axis of the rotatable horizontal shaft.

16. The robot device according to claim 13, wherein the rack and pinion mechanism comprises a circular pinion element and a linear rack element engageable therewith such that a rotational movement that rotates said circular pinion element causes said linear rack element to move linearly;
  the mobile actuator comprising a second motor configured to generate the rotational movement that rotates said circular pinion element;
  wherein said linear rack element comprises two spaced apart protrusion elements extending downwards therefrom, the two spaced apart protrusion elements engageable with the fixation element.

17. The robot device according to claim 16, wherein the two spaced apart protrusion elements are configured to push the fixation element sideways when engaged therewith, upon a linear movement of the linear rack element causing the change in angular orientation between the one of the plurality of connected links relative to the adjacent one of the plurality of connected links.

18. The robot device according to claim 1, the mobile actuator further comprising a second motor and a controller coupled to the first and second motors, the controller configured to activate the first and second motors.

19. The robot device according to claim 18, further comprising an encoder;
  said encoder comprising a sensor attached to the mobile actuator and coupled to the controller.

20. The robot device according to claim 18, further comprising a rotary encoder;
  said rotary encoder comprising a sensor attached to the mobile actuator and coupled to the controller, and a pair of two identifiable elements;
  wherein one of the two identifiable elements is placed on the one of the plurality of connected links and the other of the two identifiable elements is placed on the adjacent one of the plurality of connected links.

* * * * *